United States Patent
Saier et al.

(10) Patent No.: US 11,389,843 B2
(45) Date of Patent: Jul. 19, 2022

(54) APPARATUS AND METHOD FOR CONNECTING IN A SWITCHABLE MANNER

(71) Applicants: Michael Saier; Beatrice Saier

(72) Inventors: Michael Saier, Freiburg/Kappel (DE); Lothar Weber, Rheinbach (DE)

(73) Assignees: Michael Saier, Freiburg/Kappel (DE); Beatrice Saier, Freiburg/Kappel (DE)

( * ) Notice: Subject to any disclaimer, the term of this patent is extended or adjusted under 35 U.S.C. 154(b) by 0 days.

(21) Appl. No.: 16/923,419

(22) Filed: Jul. 8, 2020

(65) Prior Publication Data
US 2020/0346257 A1 Nov. 5, 2020

Related U.S. Application Data

(62) Division of application No. 14/359,384, filed on May 20, 2014, now Pat. No. 10,780,470.

(51) Int. Cl.
*F16K 11/074* (2006.01)
*B08B 9/032* (2006.01)
*F16K 11/085* (2006.01)

(52) U.S. Cl.
CPC .......... *B08B 9/0322* (2013.01); *F16K 11/074* (2013.01); *F16K 11/0743* (2013.01); *F16K 11/085* (2013.01); *Y10T 137/0419* (2015.04); *Y10T 137/4259* (2015.04); *Y10T 137/86501* (2015.04)

(58) Field of Classification Search
CPC .......... F16K 11/074; Y10T 137/86501; Y10T 137/86509; Y10T 137/86533; Y10T 137/86823
See application file for complete search history.

(56) References Cited

U.S. PATENT DOCUMENTS

| | | | | |
|---|---|---|---|---|
| 3,322,152 A | ‡ | 5/1967 | Aechter | E03C 1/0404 |
| | | | | 137/62 |
| 3,353,545 A | ‡ | 11/1967 | Price | B08B 9/28 |
| | | | | 134/171 |
| 3,422,848 A | ‡ | 1/1969 | Carson | F16K 11/0743 |
| | | | | 137/625.15 |

(Continued)

FOREIGN PATENT DOCUMENTS

| | | | | |
|---|---|---|---|---|
| DE | 2722363 A1 | ‡ | 12/1977 | |
| DE | 4425773 C1 | ‡ | 2/1996 | A45L 15/4217 |

(Continued)

*Primary Examiner* — Robert K Arundale
(74) *Attorney, Agent, or Firm* — Andrew Wilford

(57) ABSTRACT

A valve system has an apparatus formed with a plurality of material inlet ports, a flushing inlet port, and an outlet port and respective supplies of at last two different liquid materials. The supplies are each connected to a respective one of the material inlet ports, and a supply of flushing medium is connected to the flushing inlet port. A rotor at the apparatus is formed with a passage and shiftable between a plurality of positions in each of which a respective one of the inlet ports is connected to the outlet port. A controller moves the rotor between the positions such that, after each time the rotor is in a position connecting one of the material inlet ports to the outlet port and material has passed through the passage, the rotor is moved into a position connecting the passage with the flushing inlet port for flushing out the passage.

4 Claims, 21 Drawing Sheets

(56) References Cited

U.S. PATENT DOCUMENTS

Figure 4:
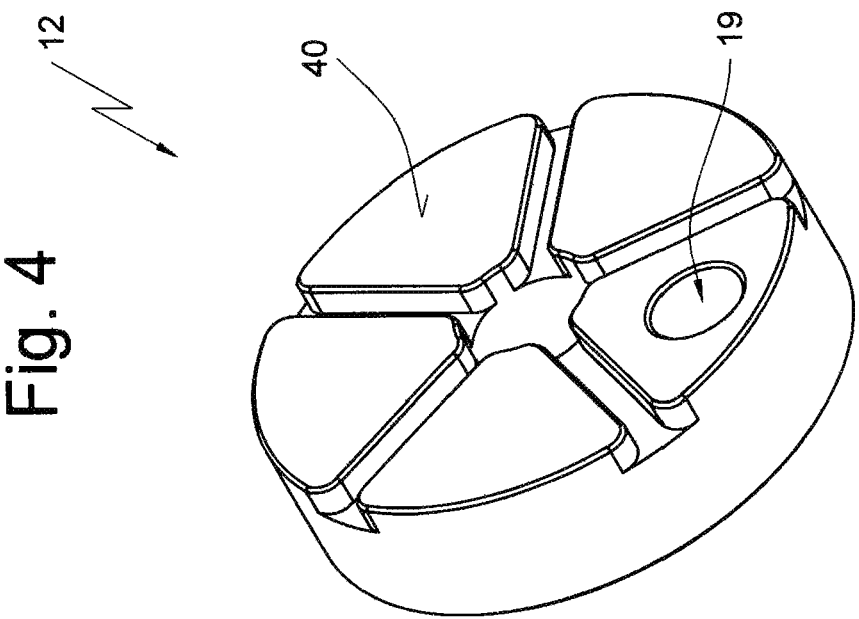

| | | | | |
|---|---|---|---|---|
| 3,568,690 | A ‡ | 3/1971 | Price | B08B 9/28 134/171 |
| 3,972,350 | A ‡ | 8/1976 | Pickett | F16K 11/074 137/624.18 |
| 4,932,227 | A ‡ | 6/1990 | Hogrefe | D06F 39/022 134/57 D |
| 5,014,211 | A ‡ | 5/1991 | Turner | B01F 15/0416 137/266 |
| 5,203,366 | A ‡ | 4/1993 | Czeck | B01F 3/088 137/3 |
| 5,261,451 | A ‡ | 11/1993 | Spencer | F15B 13/07 137/551 |
| 5,331,986 | A ‡ | 7/1994 | Lim | A47L 15/4221 134/88 |
| 5,656,090 | A ‡ | 8/1997 | Preston | B05B 12/14 118/405 |
| 5,842,599 | A ‡ | 12/1998 | Douma | D06F 39/022 222/1 |
| 6,098,646 | A ‡ | 8/2000 | Hennemann | A47L 15/44 137/101.19 |
| 6,352,105 | B1 ‡ | 3/2002 | Serratto | F24F 3/08 137/597 |
| 7,784,310 | B1 ‡ | 8/2010 | Bradford | D06F 33/02 68/12.18 |
| 2004/0026642 | A1 ‡ | 2/2004 | Maercovich | F16K 31/404 251/12 |
| 2004/0035475 | A1 ‡ | 2/2004 | Bradford | F16K 11/074 137/625.11 |
| 2010/0132103 | A1 ‡ | 6/2010 | Maercovich | E03D 3/02 4/324 |
| 2011/0154864 | A1 ‡ | 6/2011 | Schulze | F16K 11/0743 68/17 R |

FOREIGN PATENT DOCUMENTS

| | | | |
|---|---|---|---|
| DE | 19946924 A1 ‡ | 5/2001 | |
| DE | 10161858 A1 ‡ | 6/2003 | |
| DE | 102010028483 A1 ‡ | 11/2011 | |
| DE | 102011108396 A1 ‡ | 6/2012 | |
| EP | 2361691 A1 ‡ | 8/2011 | |
| GB | 2119065 A ‡ | 11/1983 | F16K 11/074 |
| WO | WO-9113278 A1 ‡ | 9/1991 | |

‡ imported from a related application

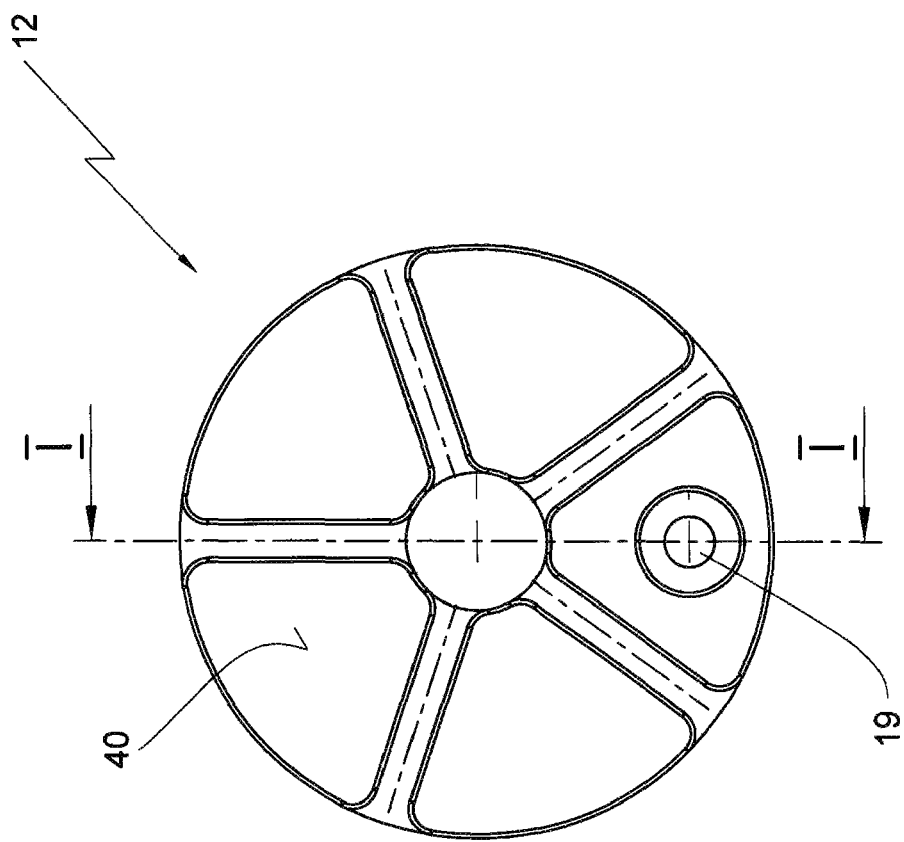
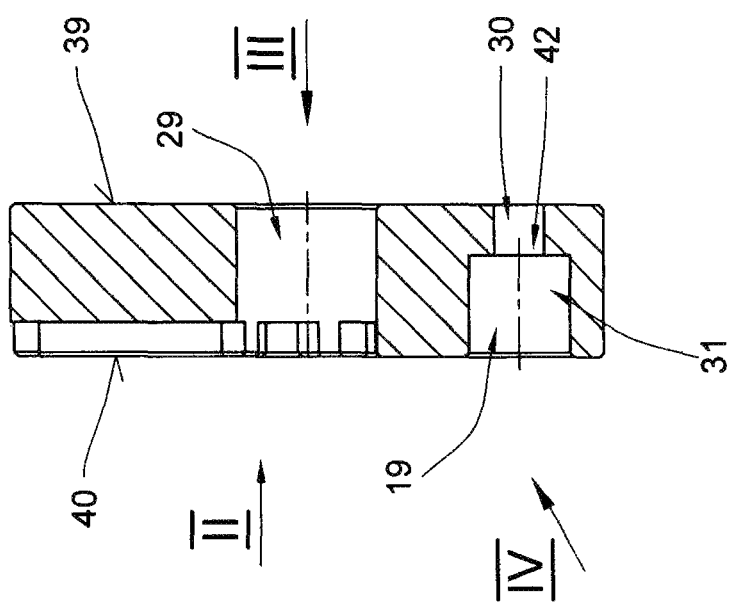

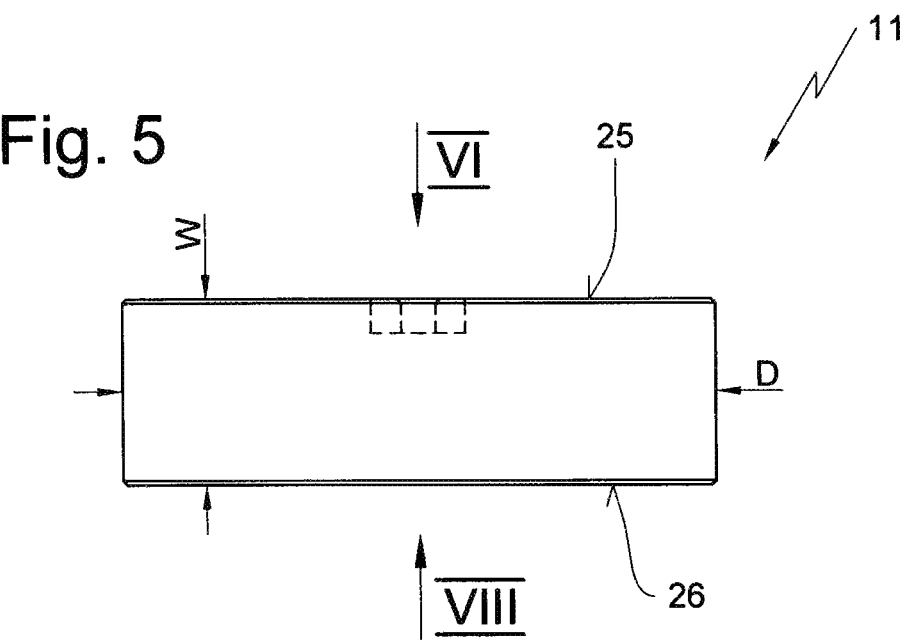
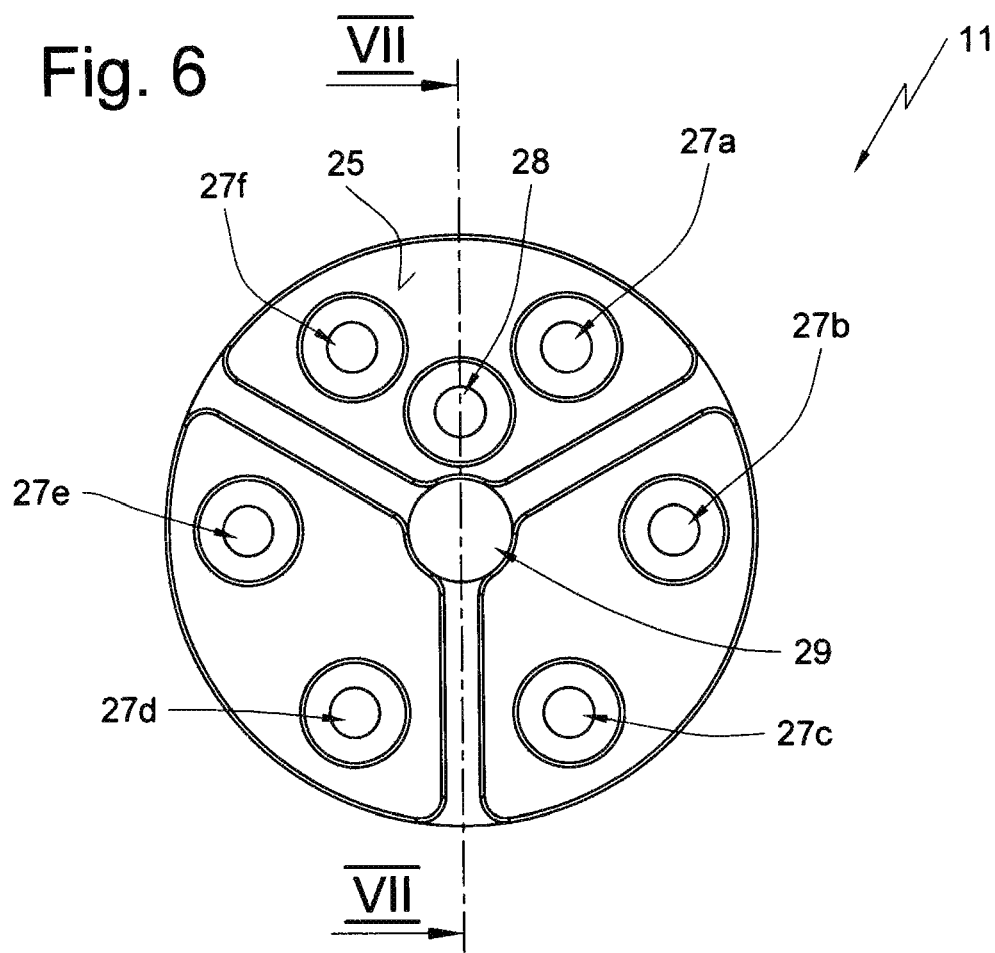

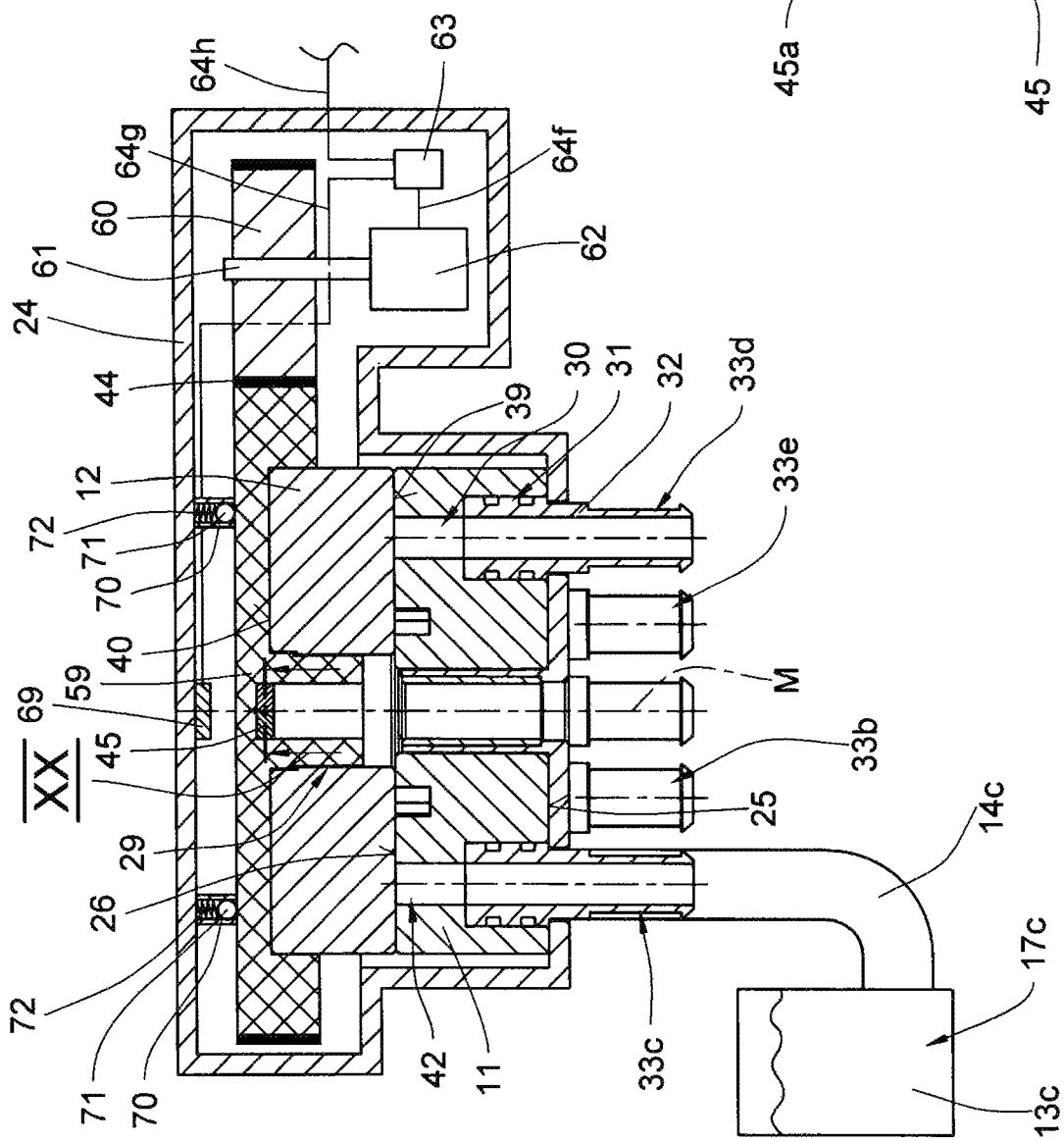

XXVIII

APPARATUS AND METHOD FOR CONNECTING IN A SWITCHABLE MANNER

CROSS REFERENCE TO RELATED APPLICATIONS

This application is a division of U.S. patent application Ser. No. 14/539,384 filed 20 May 2014 as the US-national stage of PCT application PCT/DE2012/001101 filed 20 Nov. 2012 and claiming the priority of German patent application 102011119021.3 itself filed 22 Nov. 2011.

The invention first relates to an apparatus according to the preamble of claim 1. Such an apparatus is known from the applicant's subsequently published German patent application DE 10 2011 108 396 A1.

In the case of the previously described apparatus, it already mentions the possibility of providing a flushing device in order to carry out flushing with a neutral fluid, in particular with water. In this regard, it is proposed to provide water inlet ports close to the inlet ports or in the region of the throughgoing passage.

The invention sets itself the problem of providing an apparatus that can feed different materials successively to the outlet port in an efficient and reliable manner.

The invention solves the problem with the features of claim 1, in particular with those of the characterizing part, and is accordingly characterized in that at least one of the inlet ports is constituted as a flushing medium inlet port of a flushing device, and that the throughgoing passage can be brought into a communicative connection with the flushing medium inlet port as a result of a displacement of the valve body for the purpose of flushing the passage.

The principle of the invention essentially consists in making available an apparatus that comprises a plurality of inlet ports and at least one outlet port. Each of the inlet ports can be connected to a material supply container, for example with the aid of a line, e.g. a hose. Material supplies of different materials or media, i.e. different fluids, are present in the containers. A number of material containers corresponding to the number of inlet ports or a smaller number of containers can be provided.

According to the intended purpose and application of the apparatus, the outlet port of the apparatus can be connected by a line, e.g. a hose line, to a user. The user can for example be a washing machine, in particular a textile-washing machine, e.g. an industrial washing machine or a household washing machine or a rinsing machine, e.g. a dish-washing machine or a bottle-washing machine or a container-washing machine. Depending on the intended purpose of the apparatus, for example in food processing or production, the user can however also be of a completely different type, for example provided by a pizza oven or, in the case of applications in the chemical industry, a mixing container, a boiler or suchlike. The outlet port of the apparatus can also be constituted and positioned such that various essential oils are fed through it to a flow of steam for the operation of a sauna.

The apparatus further comprises a valve body displaceable relative to the inlet ports. It can be a rotationally displaceable valve body, for example in the form of a disk, preferably made of ceramic, or alternatively a linearly displaceable valve body. The valve body comprises a passage that can be brought into a communicative connection optionally with a respective one of the various inlet ports.

A slip agent, e.g. a penetrating oil or a grease, can be used on the inlet port side of the displaceable valve body, the inlet port side providing the sealing function. This also applies in the case where the valve body is made of ceramic material.

At least one pump is preferably disposed downstream of the passage.

If the passage is in a communicative connection with an inlet port, an subatmospheric pressure can be generated in the passage by operation of the pump and the corresponding material can be carried out through the respective inlet port, carried into the passage and transported to the outlet port.

Different materials or media, e.g. different fluids, can preferably be present in the containers, which materials or media must not or should not enter into contact with one another and which should be accommodated separate from one another, e.g. because they are aggressive, or explosive, or reactive.

In order to transport these different materials in the desired quantity and at the desired time to the user, and to prevent residues in the passage or in the region of the line between the outlet port and the user from becoming undesirably mixed together or from reacting with one another, a flushing device is provided according to the invention. Assigned to this flushing device is a flushing medium inlet port, through which flushing medium can be carried into the apparatus. At least one of the inlet ports of the apparatus is constituted as a flushing medium inlet port. As a result of a displacement of the valve body, the passage can be aligned not only with the material inlet ports, but also with at least one flushing medium inlet port, preferably one of a plurality of flushing medium inlet ports. Once the passage has aligned with a flushing medium inlet port, the passage is in a communicative connection with the flushing medium inlet port and can be flushed. Simultaneously with the flushing of the passage, flushing of the outlet port can also take place, as well as flushing of the line located downstream of the outlet port or a section of this line and/or for example a pump disposed downstream of the outlet port.

Flushing can take place with a suitable flushing medium, e.g. with fresh water or process water, or with another medium, this depending on the intended application of the apparatus.

By constituting at least one of the inlet ports as a flushing medium inlet port of a flushing device, a feed-in of a flushing medium upstream of the passage can be achieved in a particularly favorable manner. In order to carry out the feed-in of a flushing medium, it is sufficient to displace the valve body and to assume a position in which the passage is in a communicative connection with a flushing medium inlet port.

The contents of the above-described post-published patent application DE 10 2011 108 396 A1 are thus included in the contents of the present patent application, also for the purpose of reference to individual features.

Provision can advantageously be made such that a flushing medium inlet port is disposed between two respective material inlet ports. Each time when a fluid, i.e. a chemical for example, has been carried into the passage, and the valve body is then moved in order to align with another inlet port so as to perform a further material input, a flushing medium inlet port can be crossed by the passage, so that for example a flushing procedure necessarily takes place before a further material input takes place, or alternatively there is at least a possibility of carrying out a flushing procedure. Under certain circumstances, it may also be desirable, for example when a particular washing program is being carried out, for two different materials to be mixed already in the passage or at any rate at an early stage, without a flushing procedure being required or desired.

Alternatively, provision can be made such that a flushing medium inlet port is disposed between two respective pairs of material inlet ports. A flushing medium inlet port can thus be accessed by a valve body displacement through a very small angle of rotation.

Moreover, the embodiment according to the invention of at least one of the inlet ports as a flushing medium inlet port brings particular advantages with regard to guaranteeing tightness. For the sealing of the flushing medium inlet port or, in the case of a plurality of flushing medium inlet ports, the sealing of this plurality of sealing medium inlet ports with respect to the exterior, use can be made of the same sealing surface of the valve body that—depending on the displacement position of the valve body—also serves to seal the material inlet ports with respect to the exterior. An overall high degree of tightness of the apparatus can thus be achieved with at the same time a simple design of the apparatus.

According to an advantageous embodiment of the invention, the flushing device comprises a flushing medium distributor passage. The latter can connect a common flushing medium supply to a plurality of flushing medium inlet ports or flushing medium inlet ports. For example, there is the possibility of constituting the apparatus by two ceramic disks or disks made of another material rotatable relative to one another. An inlet port disk comprises on its inlet port side a series of material inlet ports and a common flushing medium inlet port. The outlet port side of the inlet port disk comprises a number of openings corresponding to the material inlet ports, and an arrangement of a half-open groove with a plurality of groove extensions disposed star-shaped. This groove is constituted overall as a flushing medium groove. Each of the groove extensions extends between two material inlet ports. Each flushing medium inlet port is thus disposed between two material inlet ports.

According to a further aspect, the invention relates to a method for the switchable connection of an inlet port to an outlet port according to claim 4.

The problem underlying invention is to provide a method with which different materials can be fed successively to an outlet port in a particularly straightforward and reliable manner.

The invention solves this problem with the features of claim 4.

According to a first process step, and the valve body, i.e. for example a ceramic disk of an apparatus according to claim 1, is displaced. A displacement of the valve body into a first position takes place. In this position, a passage that is a component part of the valve body, i.e. a component part of the outlet port disk for example, can be brought into communicative connection with a first inlet port. The first inlet port is connected to a supply container of a first material or medium.

A pump is operated according to a further step. The pump is disposed in particular downstream of the outlet port. It can for example be a hose pump.

By operating the pump, material, the so-called first material, is carried out of the inlet port into the passage and, if appropriate, depending on the size of the volume, also into line sections that are disposed downstream of the passage. An input into the passage takes place according to a predetermined duration or—taking account of the pump capacity—until a predetermined input volume is reached.

According to a further process step, the valve body is then displaced into a changed, second position. In this second position, the passage is no longer in a communicative connection with the first inlet port. In particular, in this second position of the valve body, the first inlet port is sealed off with respect to the exterior. The valve body located in the second position can also advantageously provide a communicative connection of the passage with a flushing medium inlet port.

According to a further process step, flushing medium is introduced into the passage when the passage is located in the second position of the valve body. This introduction takes place in order to flush the passage.

Furthermore, the method can be carried out in such a way that each time, after a displacement of the valve body into a position in order to introduce material from a material inlet port into the passage, a further displacement takes place in order to carry out a flushing procedure. The method is also operated advantageously in such a way that a flushing medium input takes place each time after a material input into the passage.

A displacement of the valve body advantageously takes place regularly, i.e. at least once within a predetermined period, of for example 24 hours. A movement of the valve body takes place, insofar as is it is for maintenance purposes, even when the apparatus is not in operation. By means of such a regular displacement of the valve body with respect to the inlet port disk, it is possible to prevent the decisive sealing surfaces from becoming ineffective, or the for example ceramic surfaces from adhering to one another and for example from undergoing cold welding.

According to a further aspect of the invention, the invention relates to an apparatus according to claim 7.

The problem underlying the invention is to provide an apparatus that can feed different materials successively to the outlet port in an efficient and reliable manner.

The invention solves this problem with the features of claim 7, in particular with those of the characterizing part, and is accordingly characterized in that, for the flushing of the passage, a flushing device is provided that is connected to a water main with the interposition of a pipe disconnecting device.

With regard to the definition of the terms used, reference will be made to the above statements to avoid repetition.

The flushing device preferably comprises a container, in which water is contained as a flushing medium. The water container is connected to the flushing medium inlet port by a hose line or another suitable line. The pipe disconnecting device comprises a connection to a water main. This connection comprises for example a valve that is switchable, i.e. openable and closable, from a control. Moreover, the control is connected to two level sensors that for example can ascertain an upper and a lower level in the water container. As soon as the lower level is reached or fallen below due to removal of water from the container, the control is able to ascertain this, and the valve to the water main can respond in the sense of opening. The water flowing through the opened valve can fall through a drop section and fill the container until the upper level is reached. This is ascertained by the control, with the result that the valve is closed.

In an alternative embodiment of the invention, the pipe disconnecting device comprises only one level sensor. Here, for example when a predetermined level is reached or fallen below and there is a corresponding detection by the single level sensor, it is possible by means of the control to cause the valve to open for a specific period so that a previously determined volume can then be filled into the water container.

The water present in the flushing medium container is not therefore in a direct communicative connection with the water main, but is separated from the latter by a drop section.

This thus prevents impurities, chemicals, germs or suchlike from being able to get into the drinking water network through a backflow.

Finally, in an alternative embodiment of the invention, a functional region of the apparatus itself is also able to act as a pipe disconnecting device. For this purpose, the apparatus is preferably constituted such that it provides different flow paths, it being ensured that the two flow paths cannot enter into a communicative connection with one another. For example, there can be assigned to the apparatus a second outlet port that is connected to the flushing medium container, the flushing medium container being in a communicative connection with the flushing medium inlet port. The at least two different flow paths through the apparatus, which are permanently strictly separated from one another, can be obtained for example by a rotational angle limitation of the valve body of for example 180°.

According to a further aspect, the invention relates to an apparatus according to claim 8.

The problem underlying invention is to provide an apparatus that can feed different materials successively to the outlet port in an efficient and reliable manner.

The invention solves this problem with the features of claim 8, in particular with those of the characterizing part, and is accordingly characterized in that a device for the through-flow measurement is disposed downstream of the outlet port.

The distinctive feature consists in the fact that a device for the through-flow measurement is disposed downstream of the outlet port. It can be a device that measures or monitors the through-flow volume, i.e. the through-flow quantity.

Alternatively, a time measurement can also take place that is sufficient in particular to determine the volume that has flowed through if the through-flow streams are known. The latter also depend, in particular, on the pump capacity, possibly also on other parameters. The device for the through-flow measurement is disposed downstream of the outlet port, in particular close to the pump. The pump can be any suitable pump, e.g. a hose pump.

In particular, the device for the through-flow measurement can also be connected to a computer that generates logs or documentation or to which recourse can be taken to generate logs or documentation. The generated documentation can be used to ascertain or to demonstrate what materials, e.g. what chemicals, have been used at what times and in what quantities. The acquisition of evidence of use is thus possible.

According to a further aspect, the invention relates to an apparatus according to claim 9.

The problem underlying the invention is to provide an apparatus that can feed different materials successively to the outlet port in an efficient and reliable manner.

The invention solves this problem with the features of claim 9, in particular with those of the characterizing part, and is accordingly characterized in that a device detecting the position of the valve body is provided.

An essential distinctive feature consists in the fact that a device is provided for detecting the position of the valve body. This device serves to provide a control with the possibility of acquiring information about the position in which the valve body is located at a specific time and/or about the measures that the control must take in order to approach a specific material inlet port or a specific flushing medium inlet port as a result of a displacement of the valve body.

A constant or permanent detection of the position of the valve body is preferably carried out. In an alternative embodiment, the detection of the position of the valve body can also take place periodically, i.e. regularly, or at previously determined suitable times.

The device for detecting the position of the valve body can for example comprise a measuring device that directly ascertains the position of the valve body in an optical, inductive, capacitive, electrical, magnetic or other physical manner. For this purpose, markings, e.g. optical, magnetic, electrical or other markings, can for example be provided on the valve body or be connected to the valve body.

In this connection, there is in principle also the possibility of carrying out a control of the valve body with the aid of a so-called referenced stepping motor, i.e. a special stepping motor that has a reference position and that can be addressed in such a way that the control knows the position in which the valve body driven by the stepping motor is located, or, more precisely, the position in which the passage is located.

It should be pointed out that the device for detecting the position of the valve body can also be provided with a counting apparatus, in order for example to measure or to count rotational angle ranges through which the valve body is displaced starting from a differential position.

In this connection, it should be pointed out that the possibility exists in theory of providing the valve body with more than one passage.

Furthermore, the invention relates to an apparatus according to claim 10.

The problem underlying invention is to provide an apparatus that can feed different materials successively to the outlet port in an efficient and reliable manner.

The invention solves this problem with the features of claim 10, and is accordingly characterized in that a gear-tooth system, such as toothed wheel or a toothed rod, is assigned to the valve body, the gear-tooth system cooperating with a toothed wheel that can be operated by a drive for the purpose of displacing the valve body.

A further aspect of the invention consists in the fact that a gear-tooth system is assigned to the valve body. The gear-tooth system can be worked directly into the valve body. A gear-tooth system, e.g. also made of a material other than the material from which the valve body is made, can alternatively be affixed to the valve body. For example, in the case of an essentially disc-shaped valve body made for example of ceramic, the gear-tooth system can be constituted by plastic or metal, in particular by a rim of a toothed wheel that surrounds the valve body outer peripheral surface.

If the valve body is constituted rotationally displaceable, it is advisable to provide the gear-tooth system with a toothed wheel rim. In the case where the valve body is constituted linearly displaceable, it is advisable to provide the valve body with a toothed rod.

The drive for the displacement of the valve body can preferably cooperate with a toothed wheel, i.e. can operate such a toothed wheel in the sense of a rotary motion. The toothed wheel can cooperate with the gear-tooth system and in this way displace the valve body.

According to a further aspect, the invention relates to an apparatus according to claim 11.

The problem underlying the invention is to provide an apparatus that can feed material successively to the outlet ports in an efficient and reliable manner.

The invention solves this problem with the features of claim 11.

An essential aspect of the invention consists in the fact that an apparatus according to the preamble of claim 1 is used in a geometrically inverted arrangement. The outlet port of the previously described apparatus now acts as an inlet port and the plurality of inlet ports of the previously known apparatus now act as a plurality of outlet ports and, as for the rest, the structural design of the apparatus is unchanged. In particular, a valve body can be displaced, in the manner previously described and also described in detail in the examples of embodiment, in order to connect the inlet port in a communicative manner to a respective one of the outlet ports.

According to a further aspect of the invention, an apparatus according to the preamble of claim 1 is linked in a series connection to a further apparatus according to the preamble of claim 1, in such a way that the outlet port of a first apparatus is coupled with an inlet port of the second apparatus. Further apparatuses can also be connected in series. An arbitrary large number of different material supply containers can thus be connected to the apparatus and a correspondingly selectable total number of different media mixable with one another or feedable successively to a target container can be obtained.

According to a further aspect, the invention relates to an apparatus according to claim 13.

The problem underlying the invention is to provide an apparatus that can feed different materials successively to the outlet port in an efficient and reliable manner.

The invention solves this problem with the features of claim 13.

The arrangement of an device for measuring the conductivity downstream of the outlet port offers the possibility of reliably monitoring the medium fed to the user or the users, at least insofar as a measurement of the conductivity permits a conclusion to be drawn as to the particular nature or property of the fed medium.

Figure 3:
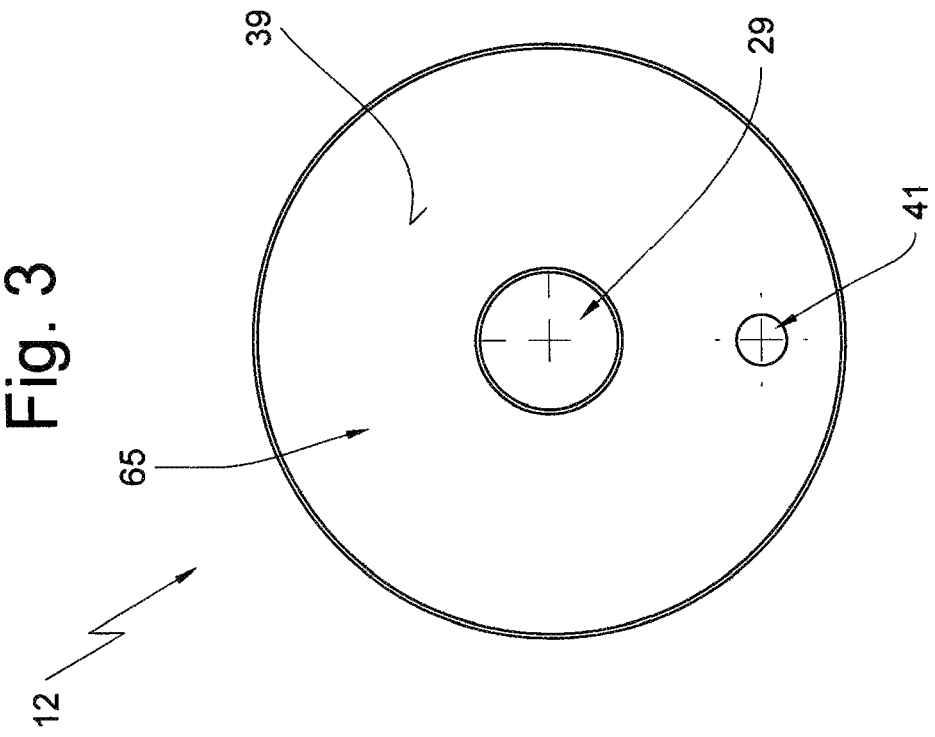
Figure 8:
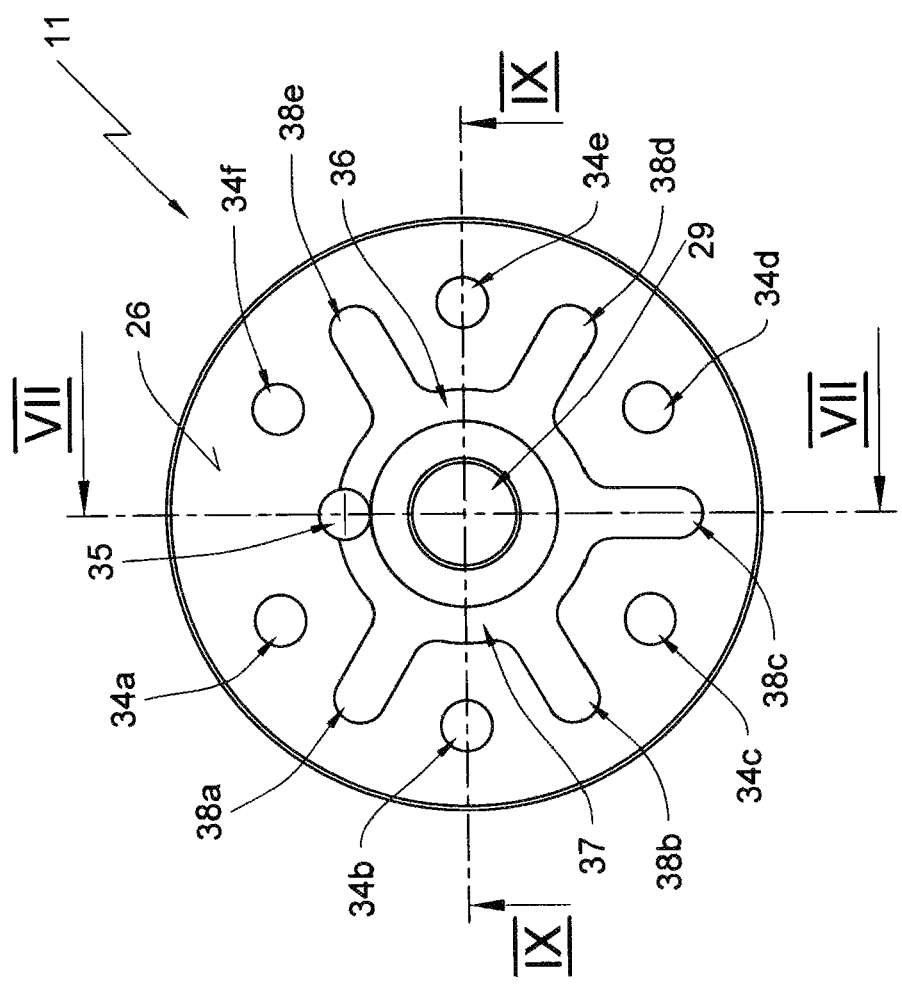
Figure 7:
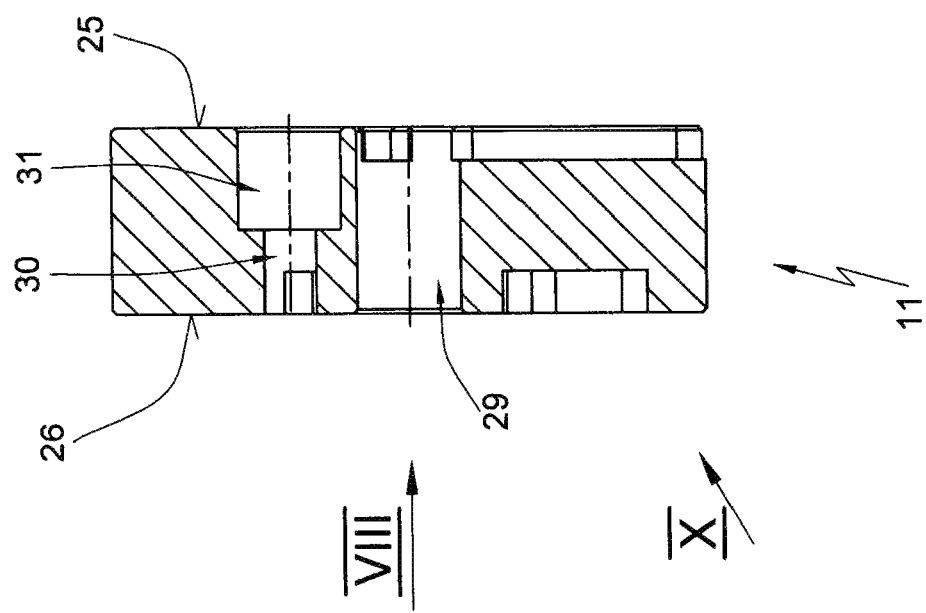
Figure 10:
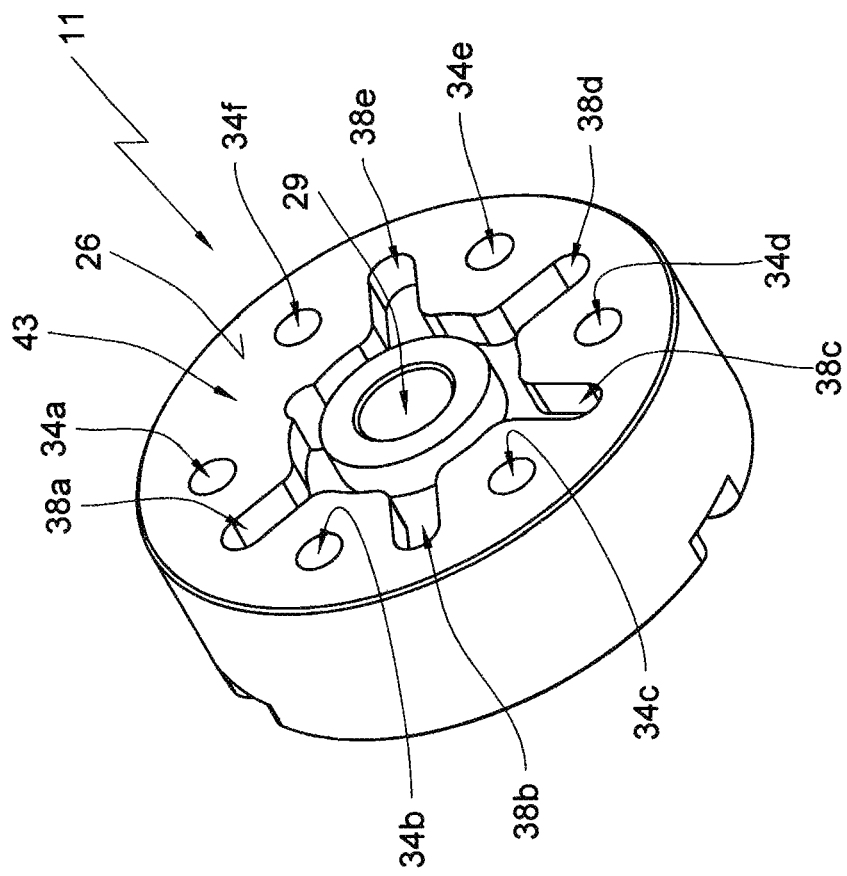
Figure 9:
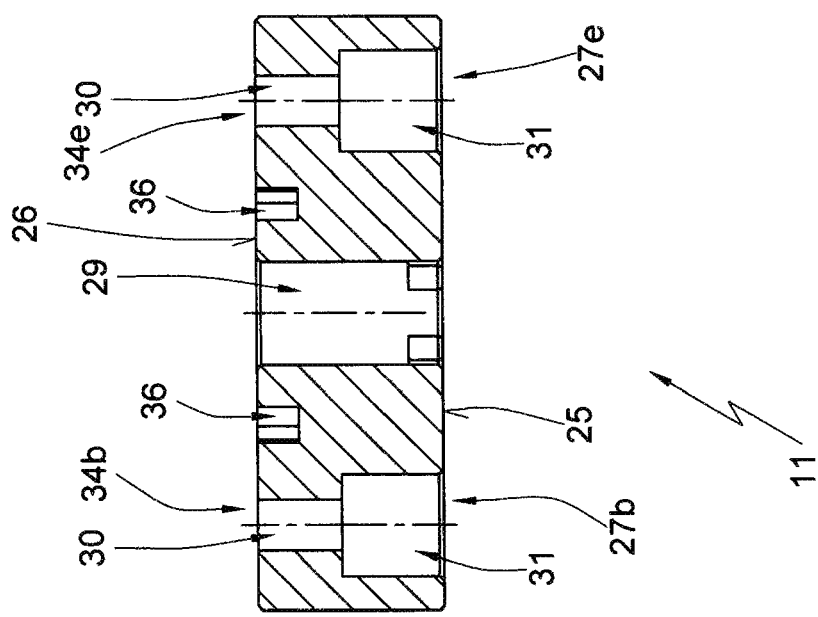
Figure 12:
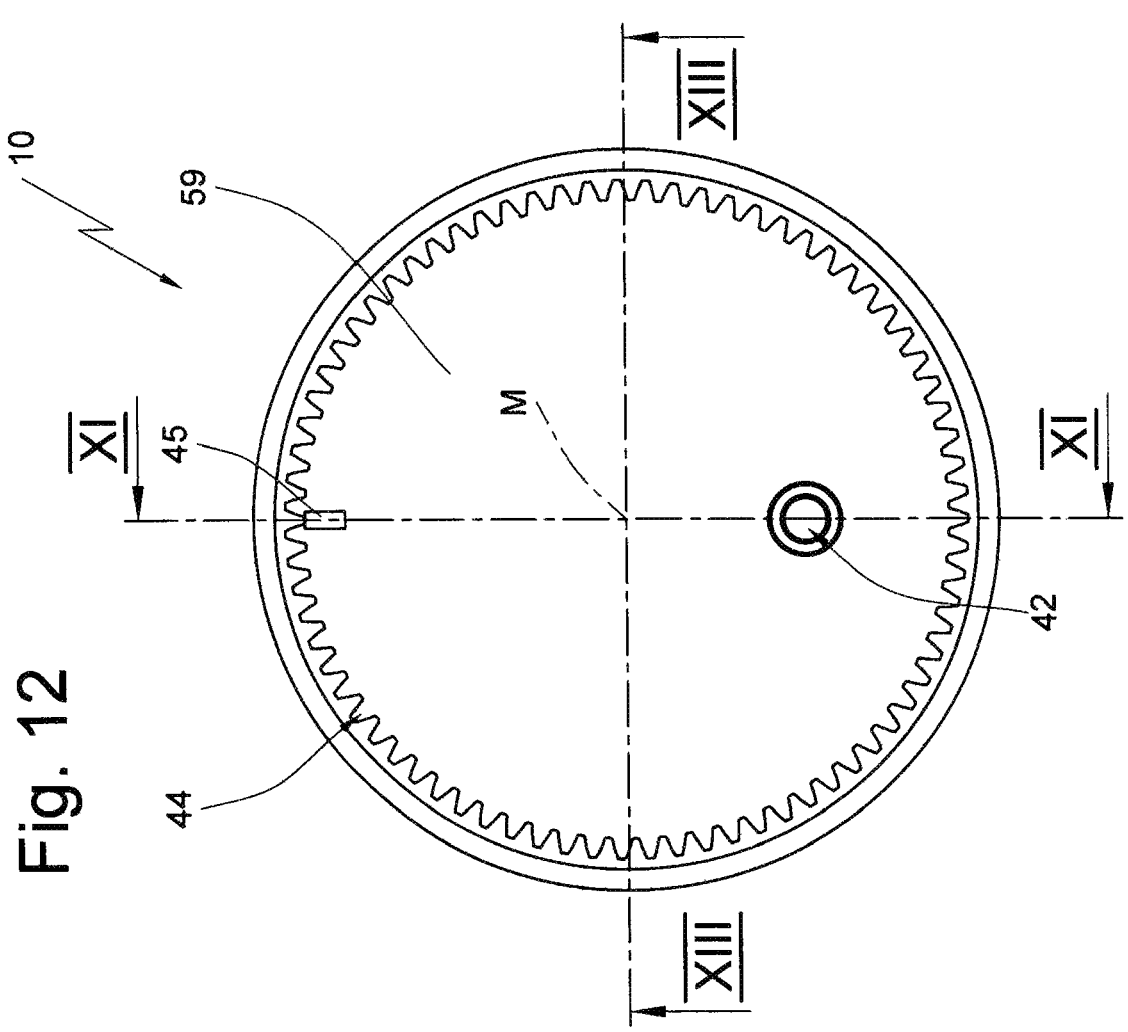
Figure 11:
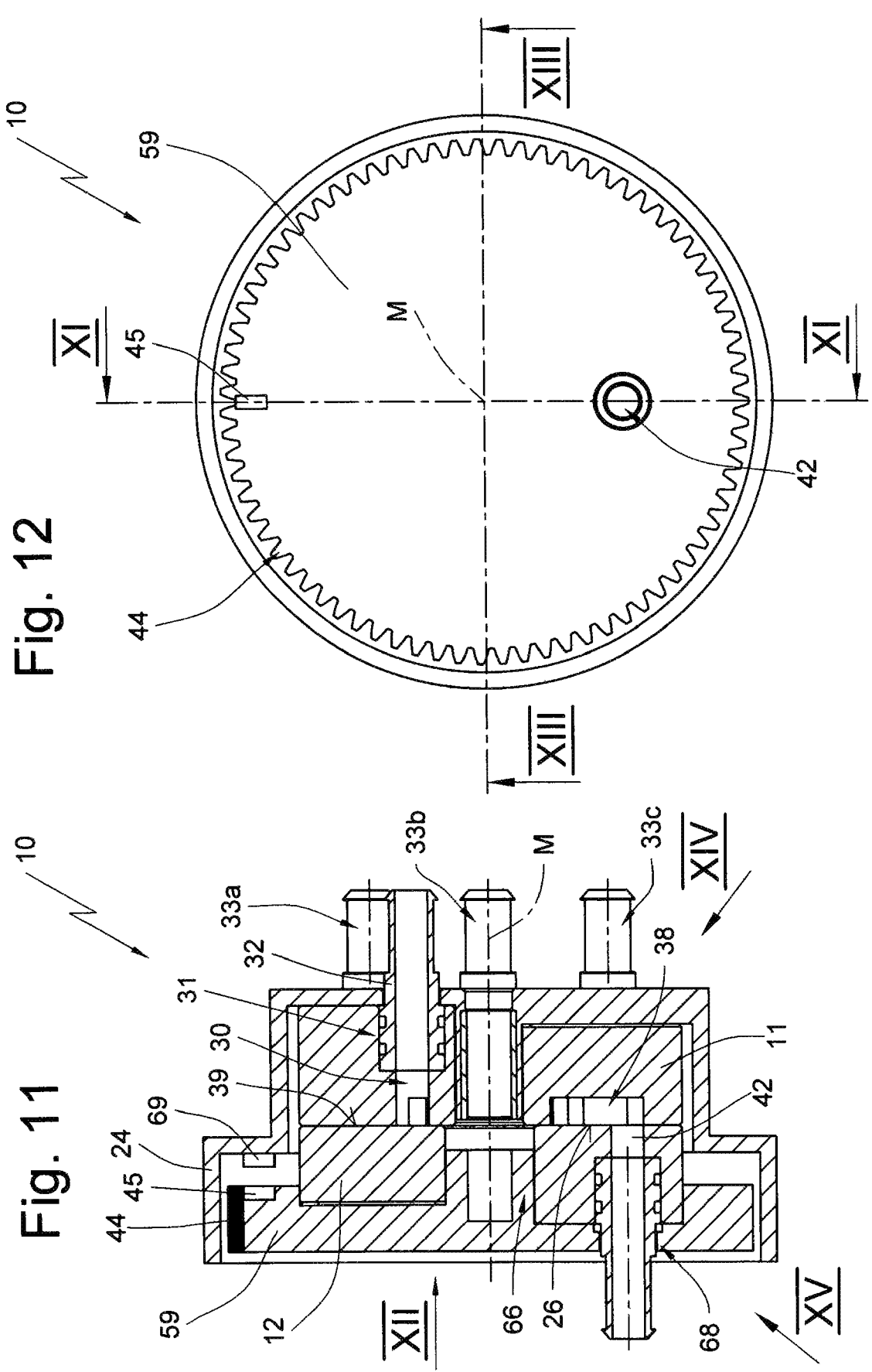
Figure 14:
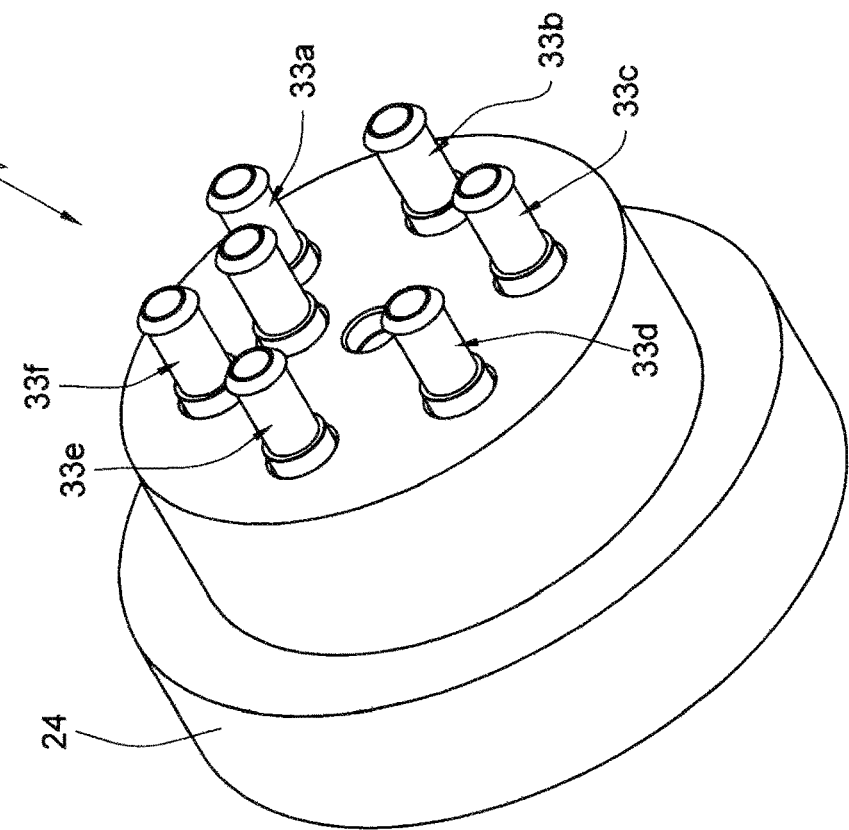
Figure 13:
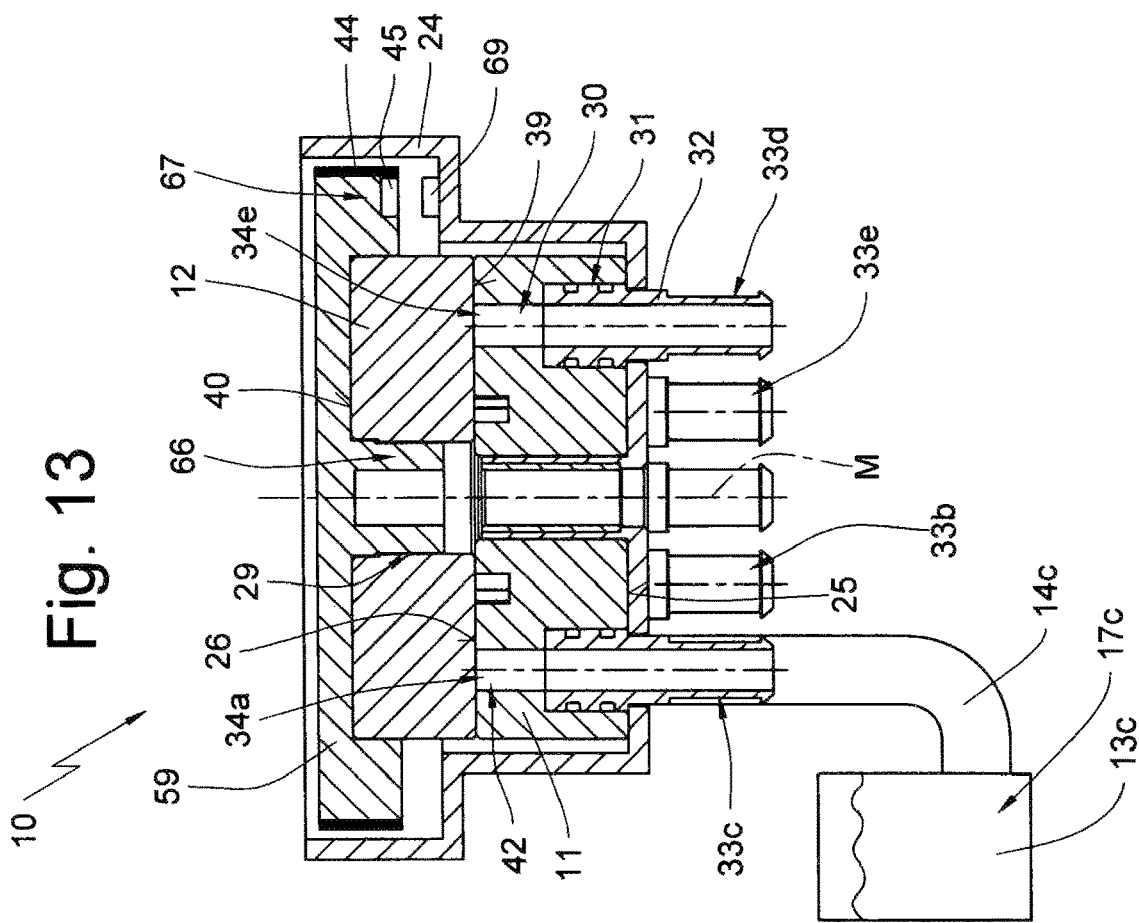
Figure 15:
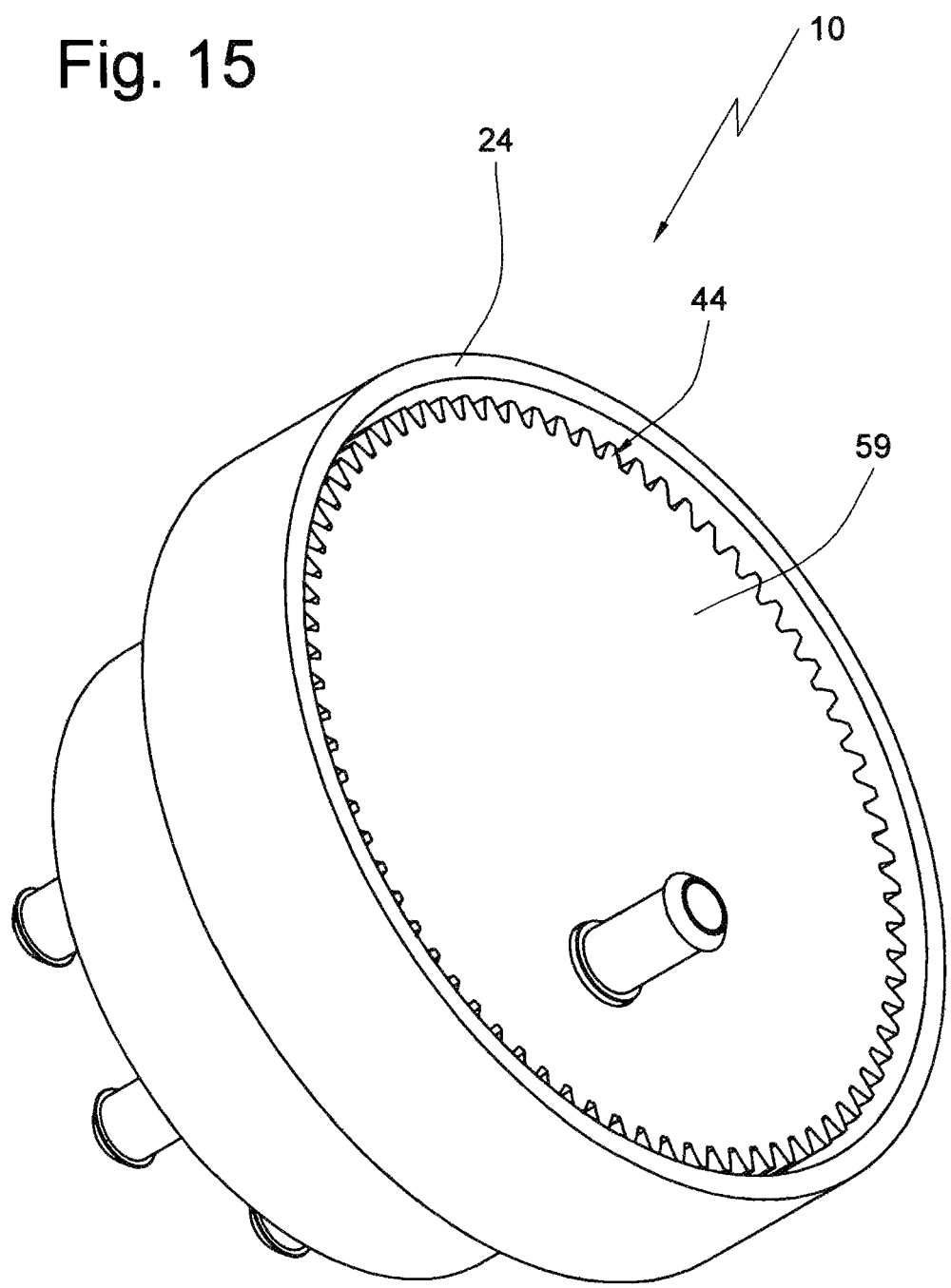
Figure 16:
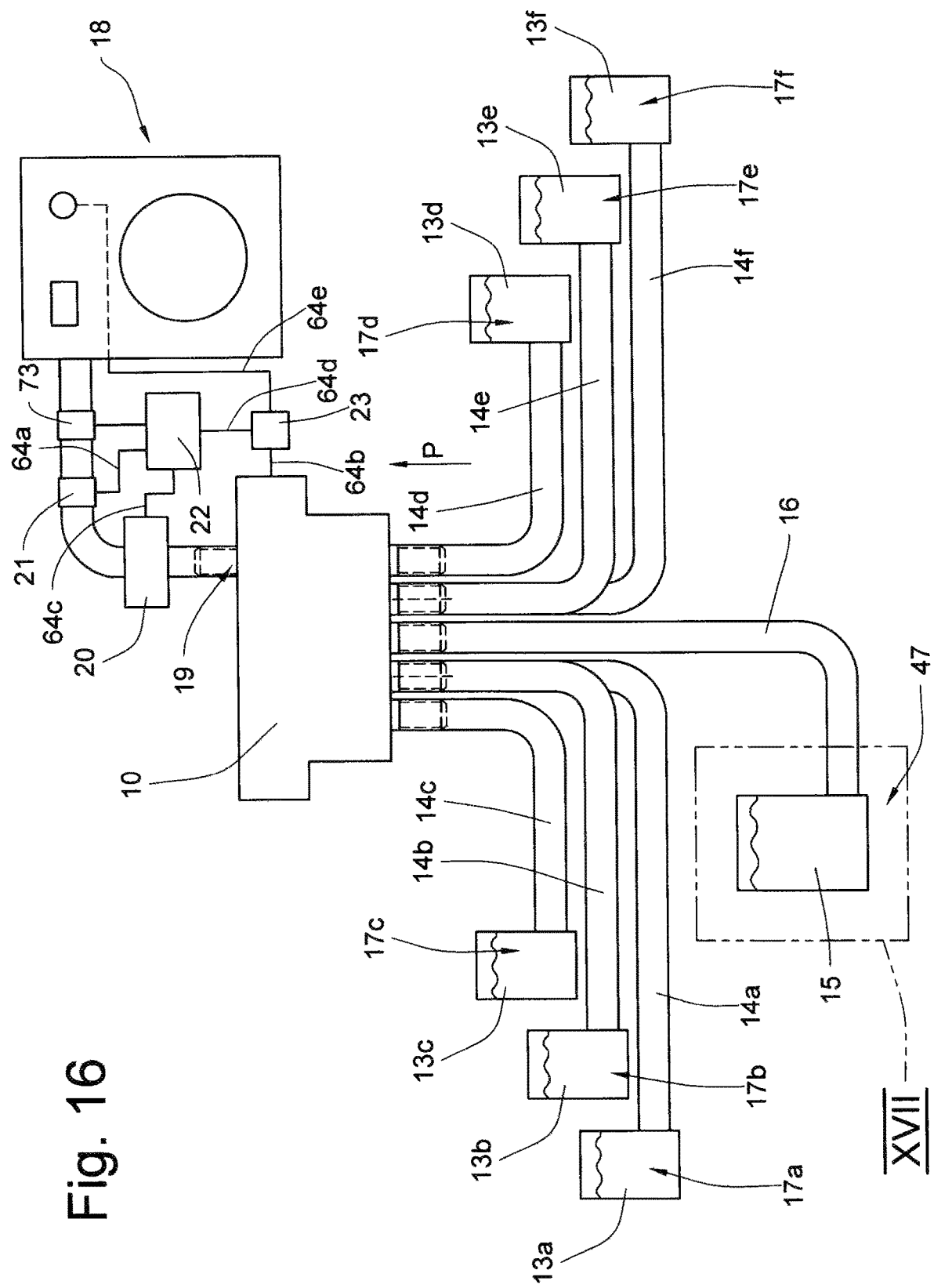
Figure 17:
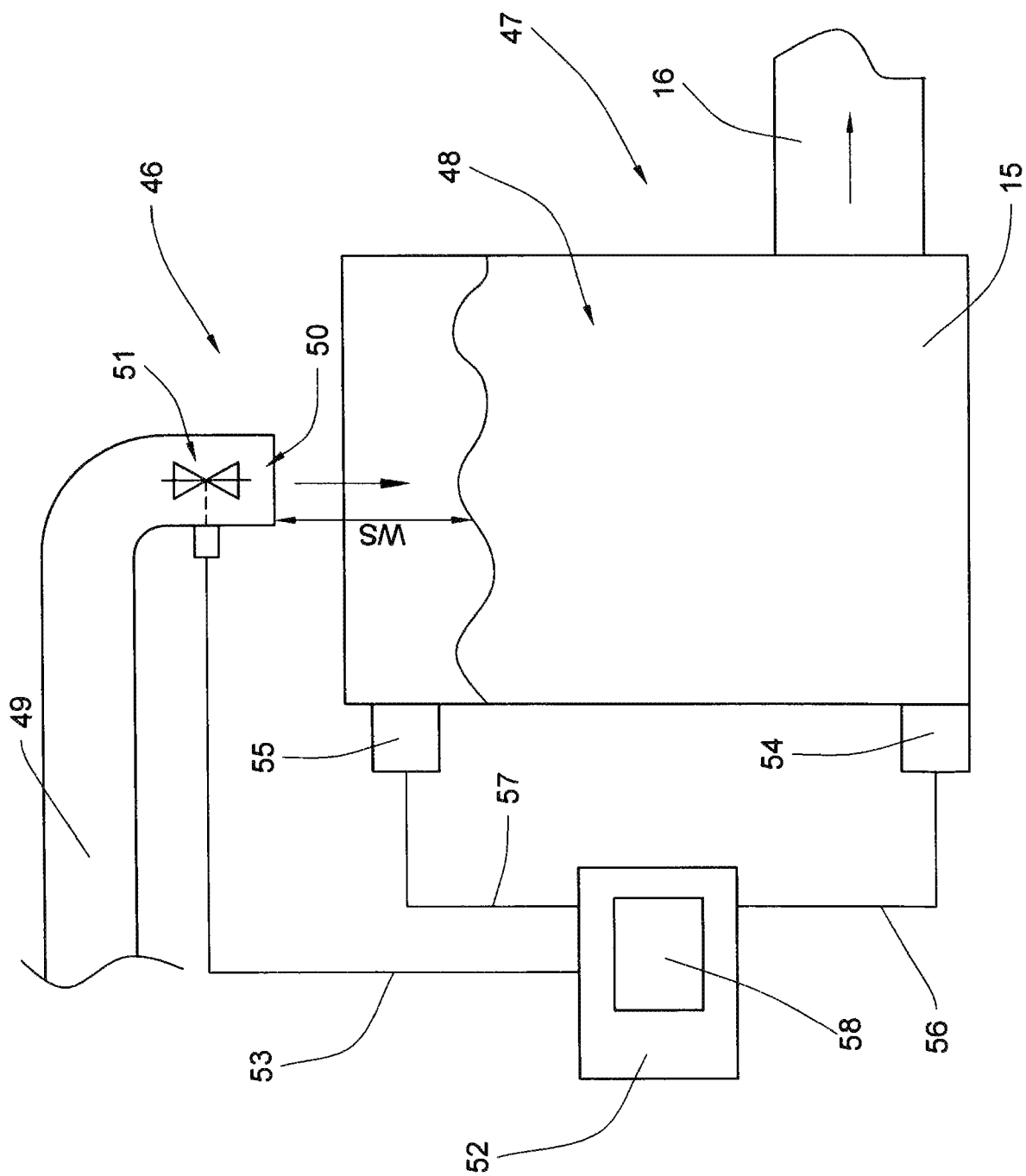
Figure 18:
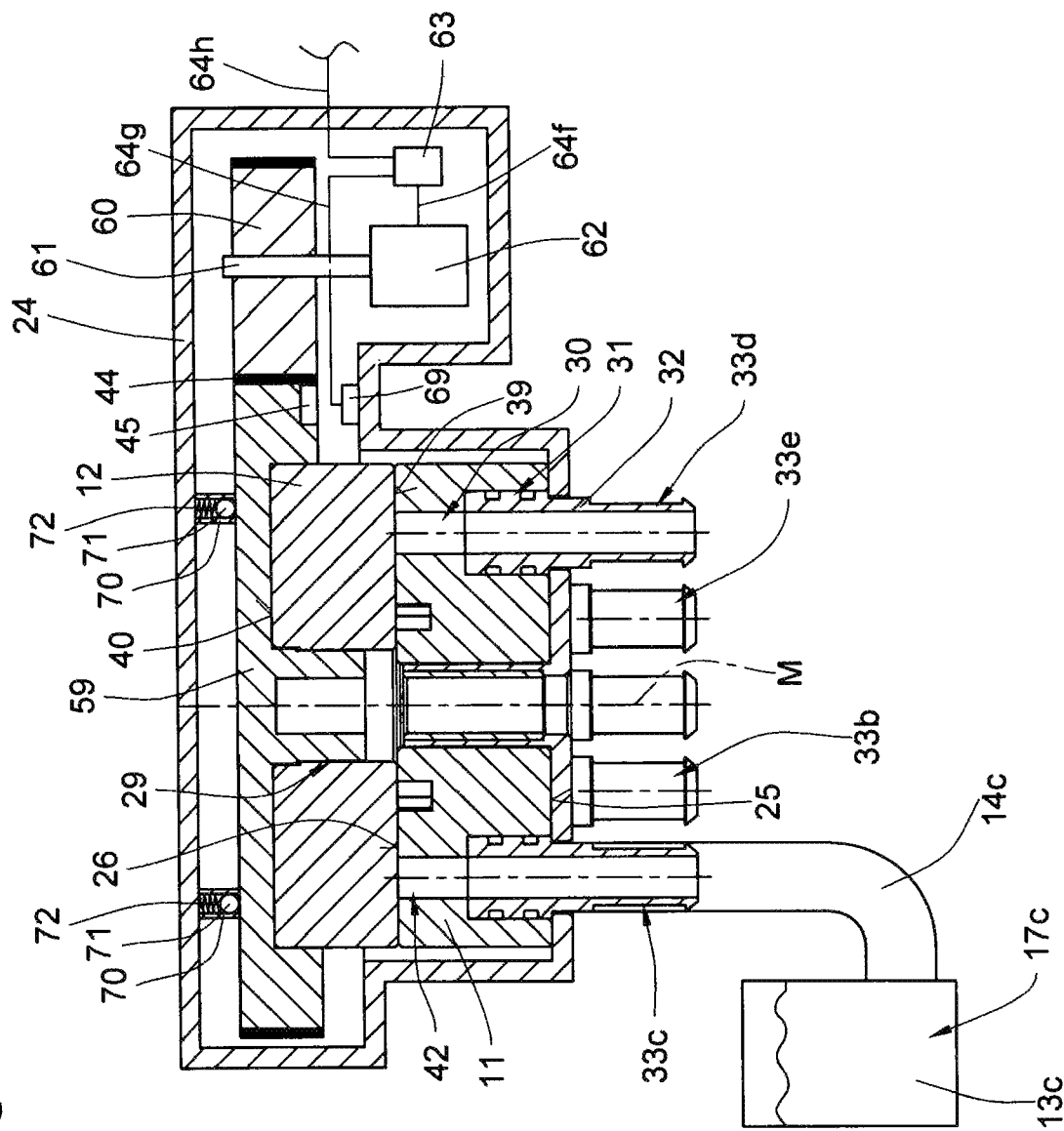
Figure 21:
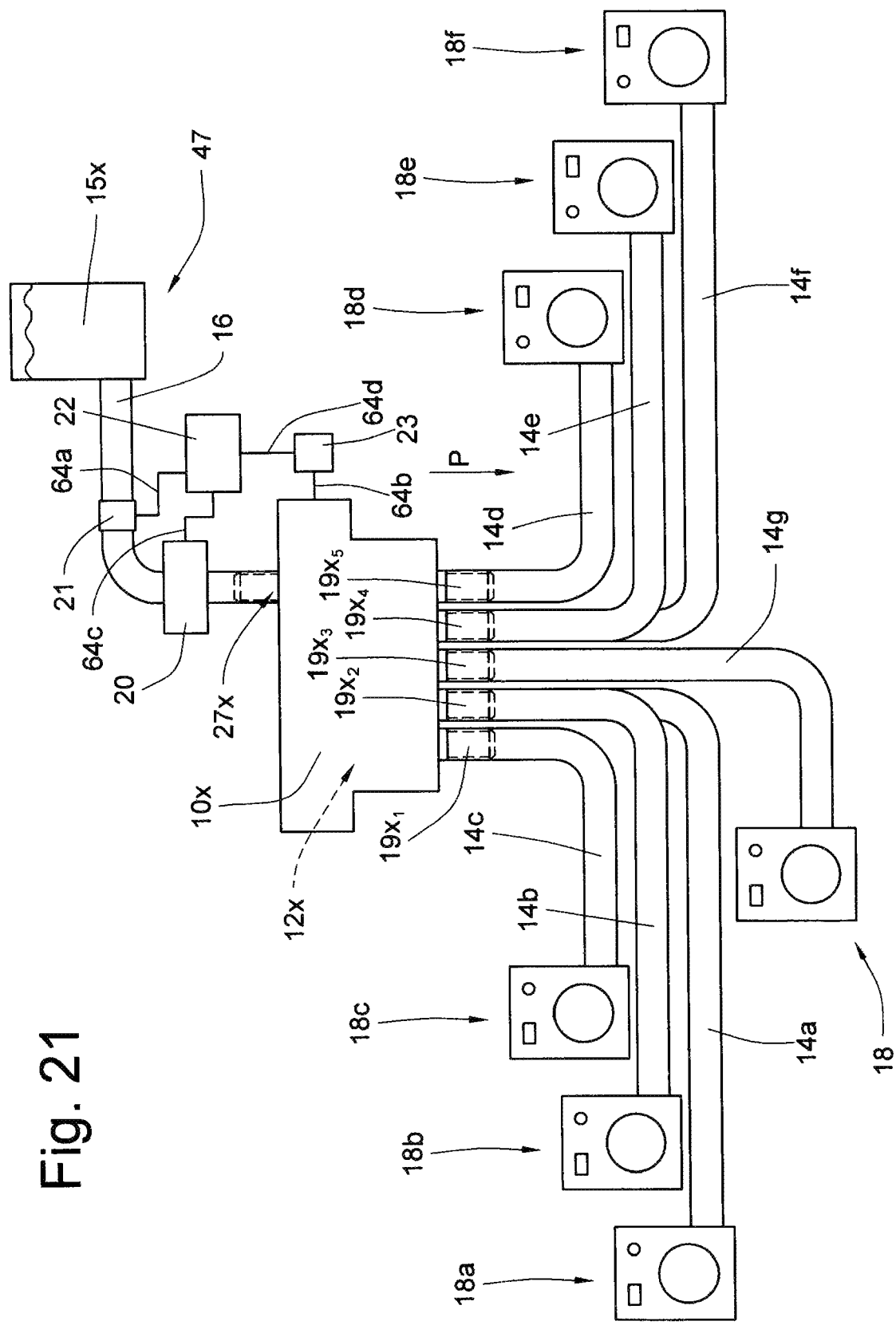
Figure 22:
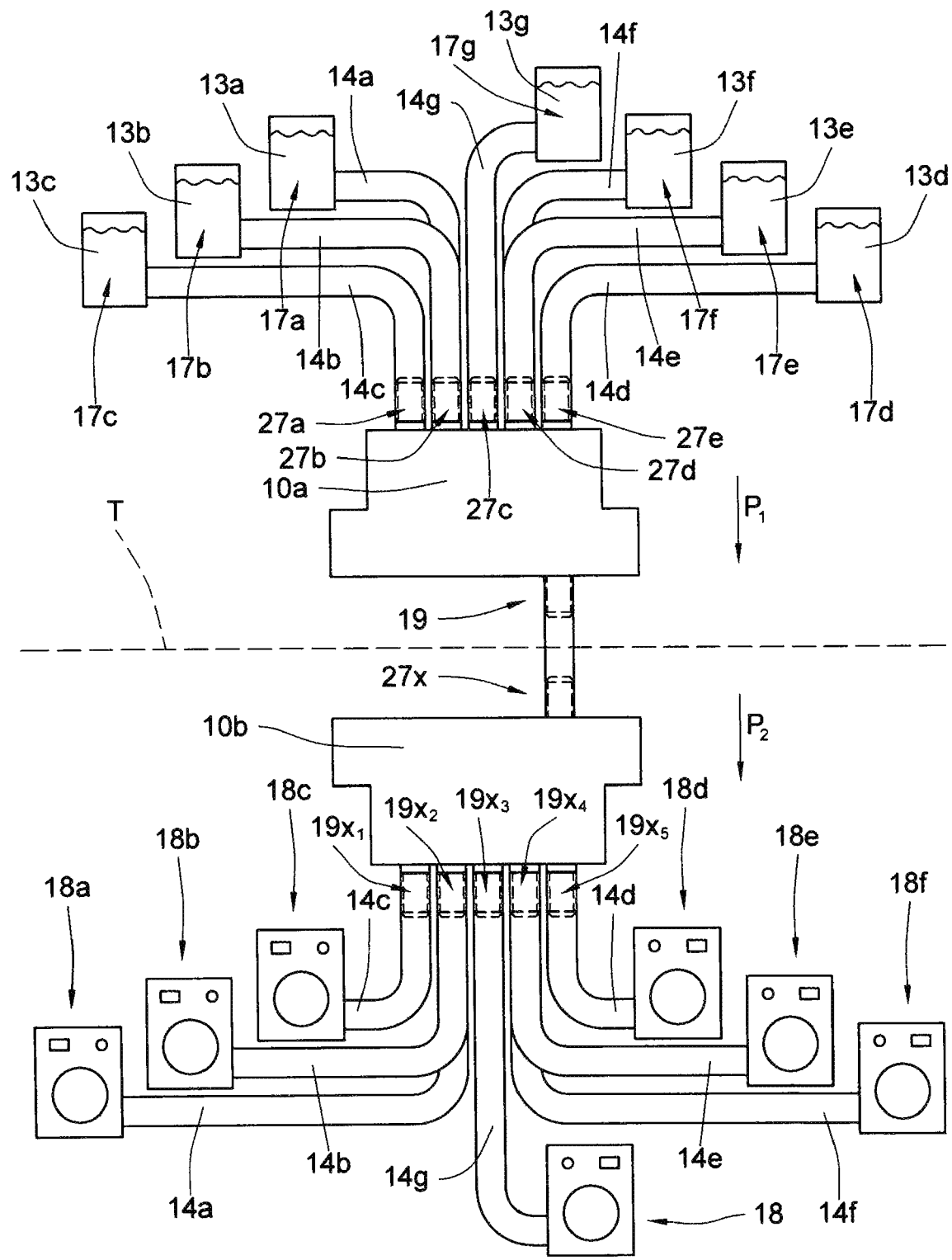
Figure 23:
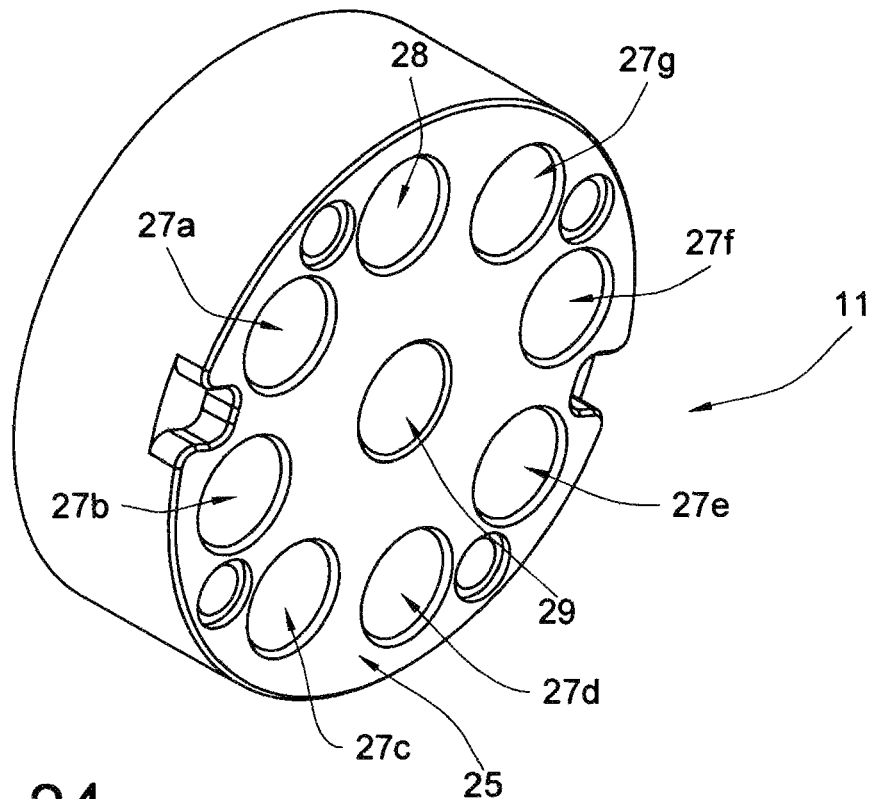
Figure 24:
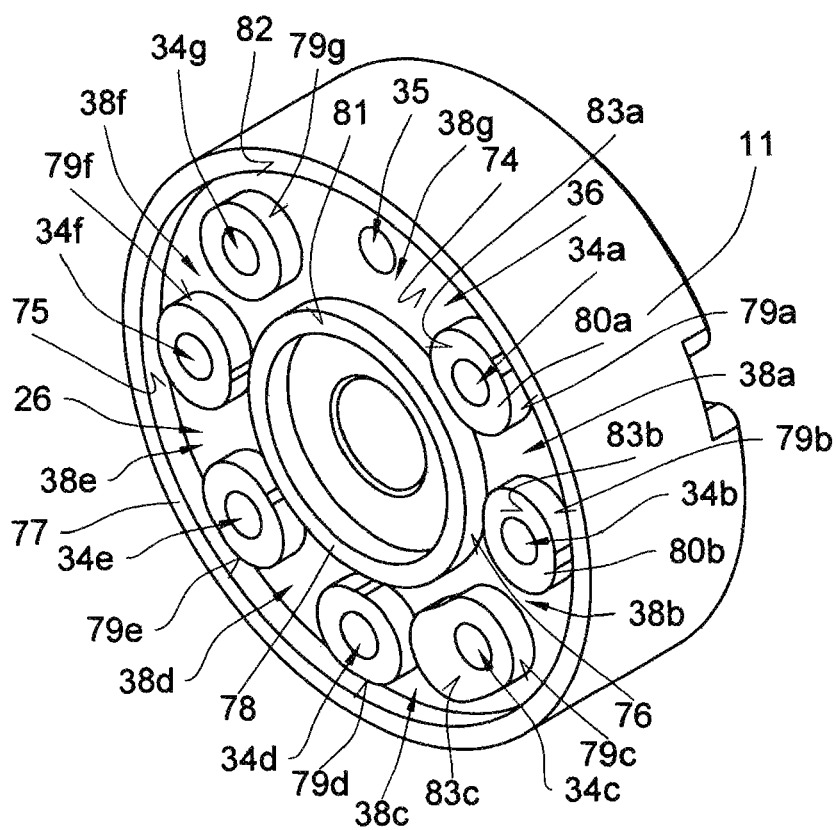
Figure 25:
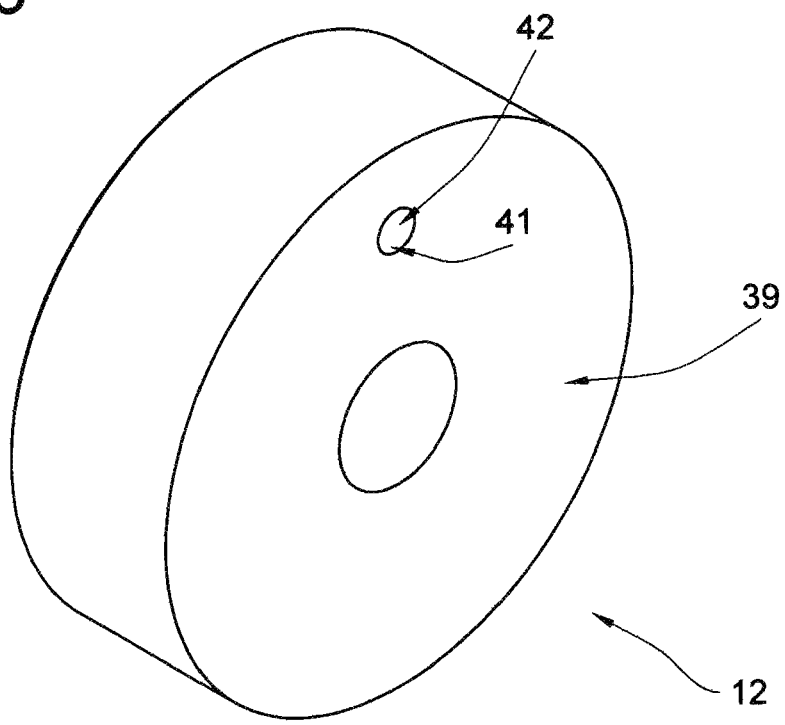
Figure 26:
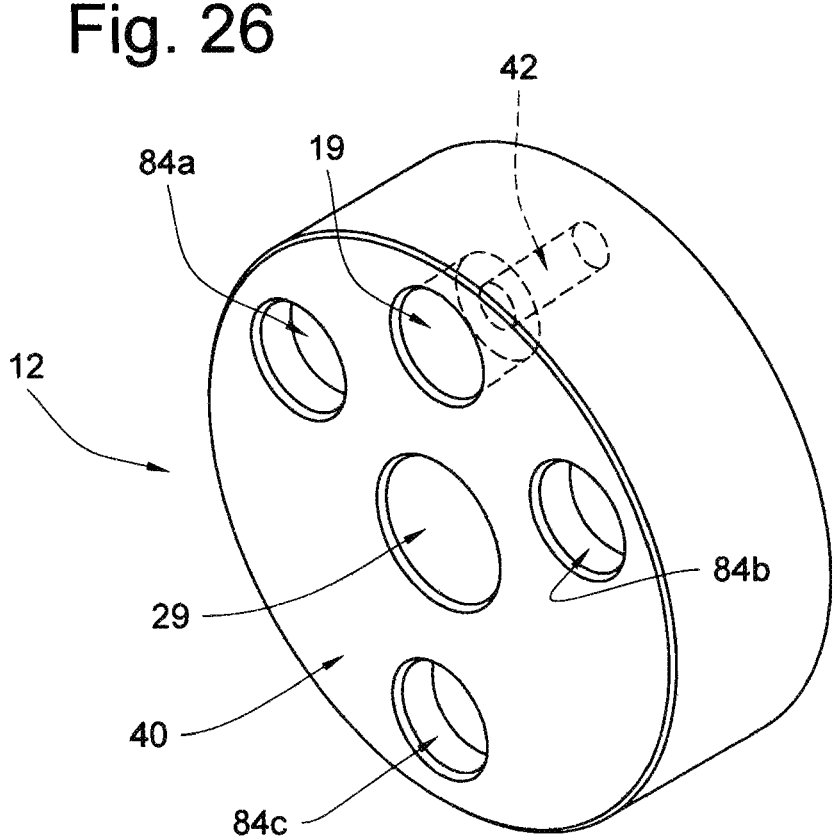
Figure 27:
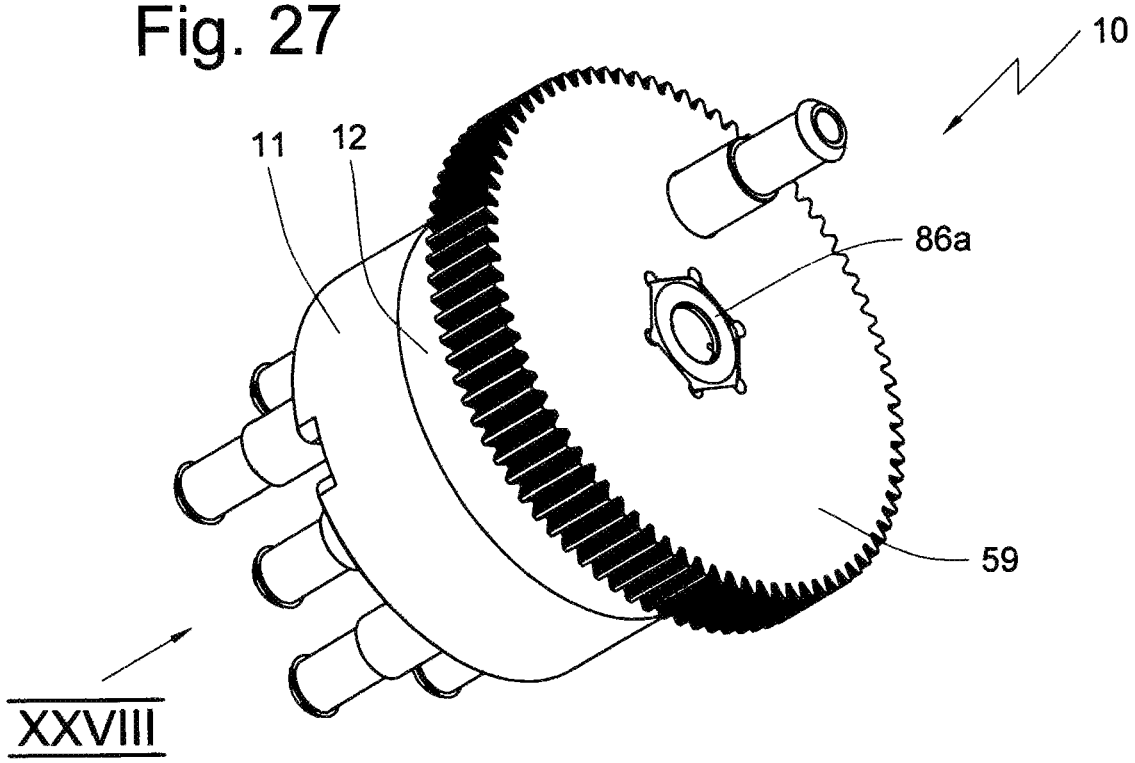
Figure 28:
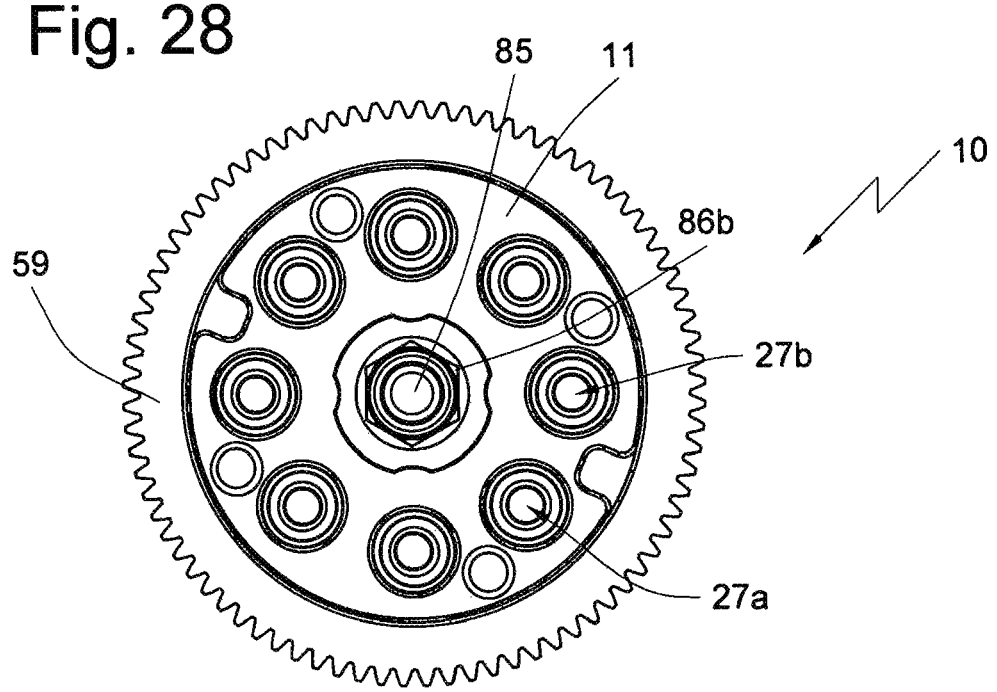
Figure 29:
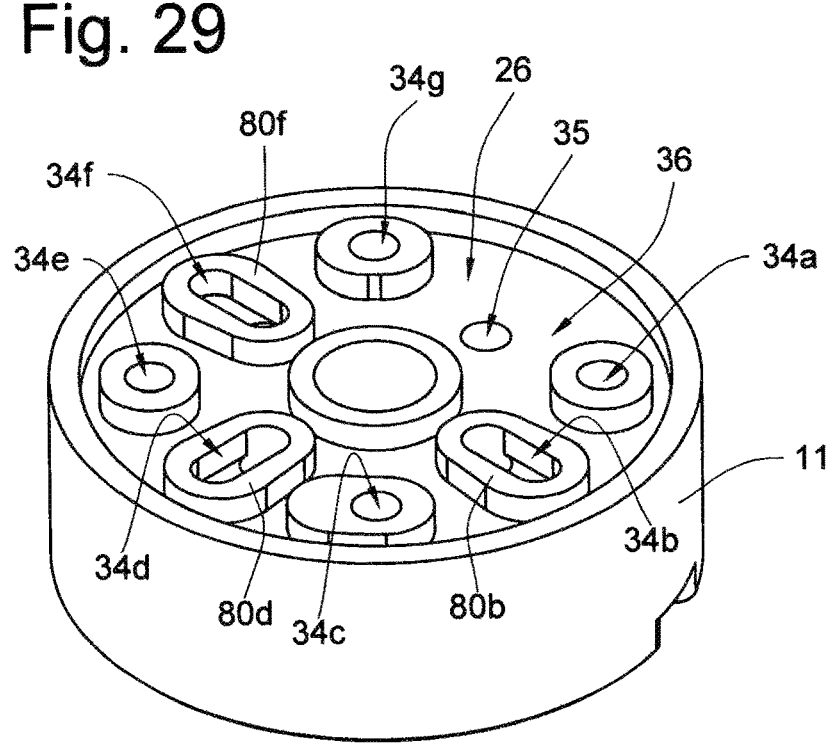
Figure 30:
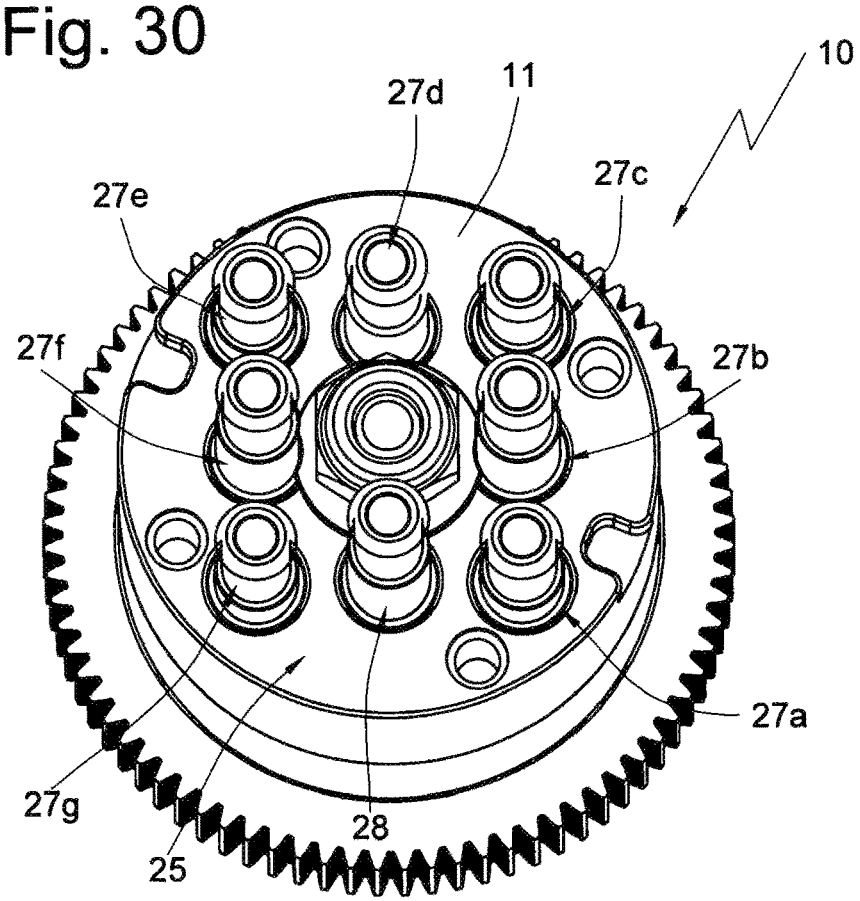
Figure 31:
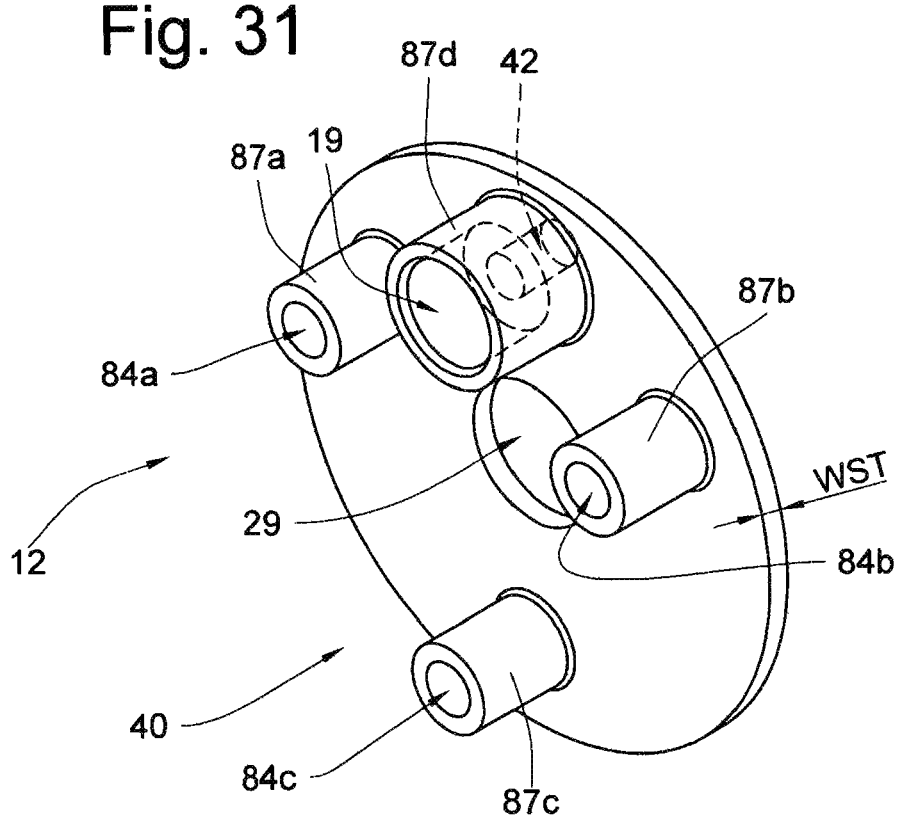
Figure 32:
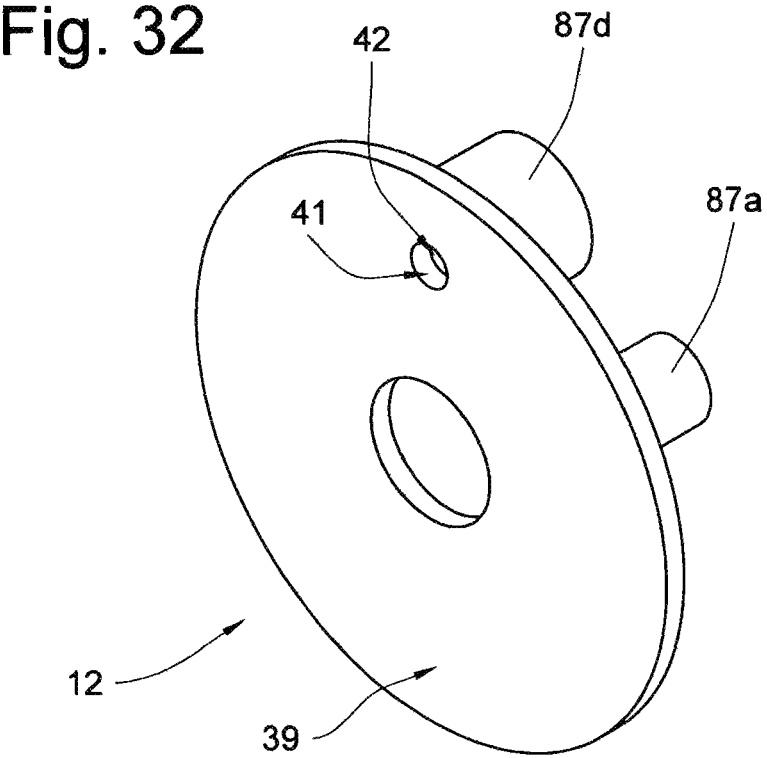
Figure 33:
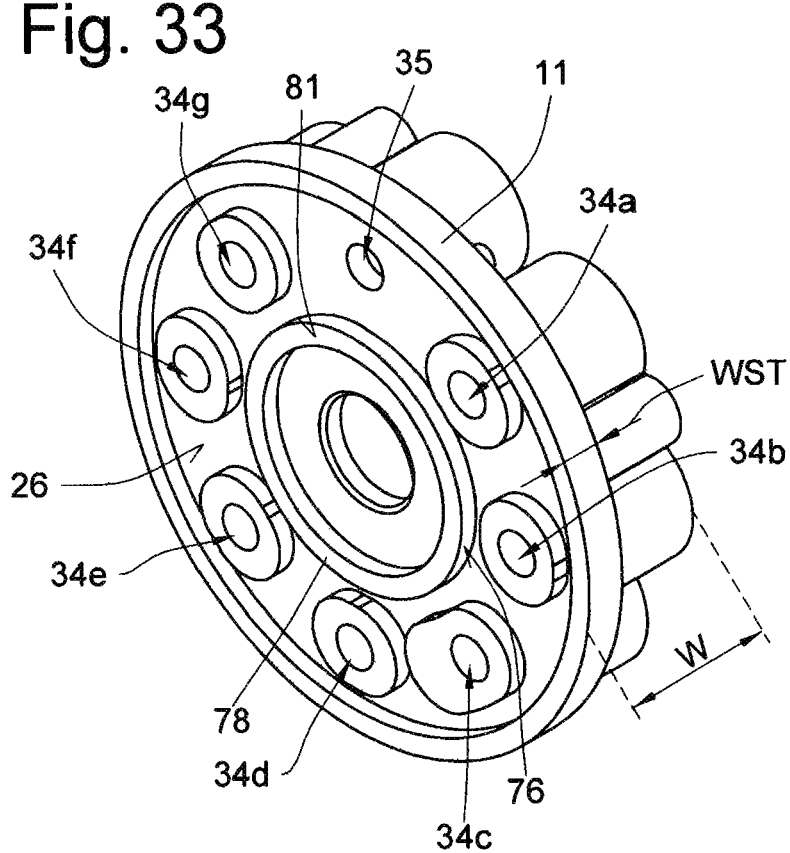
Figure 34:
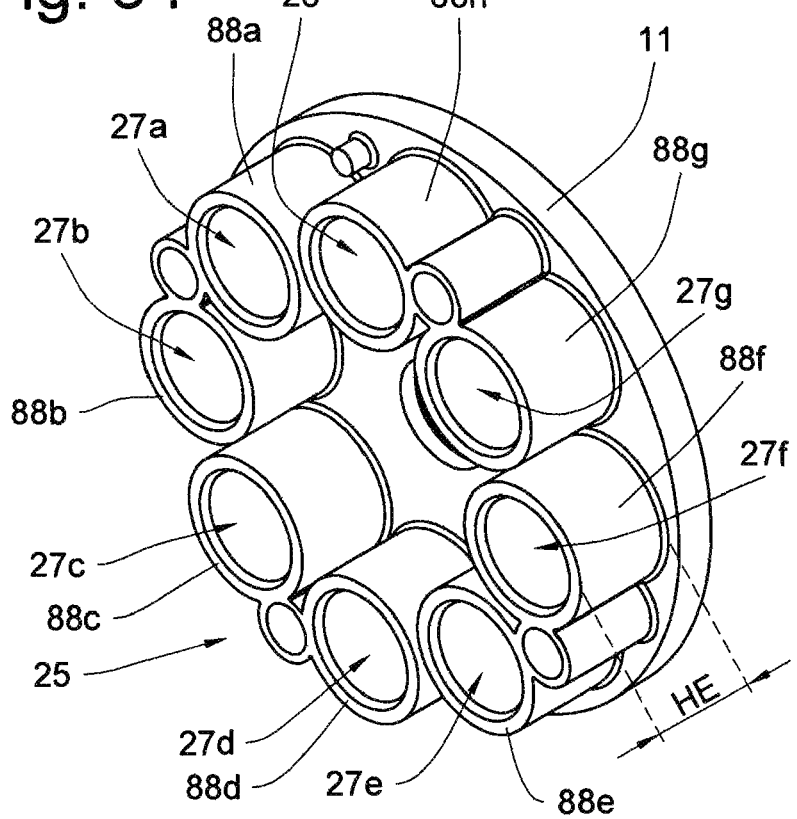
Figure 35:
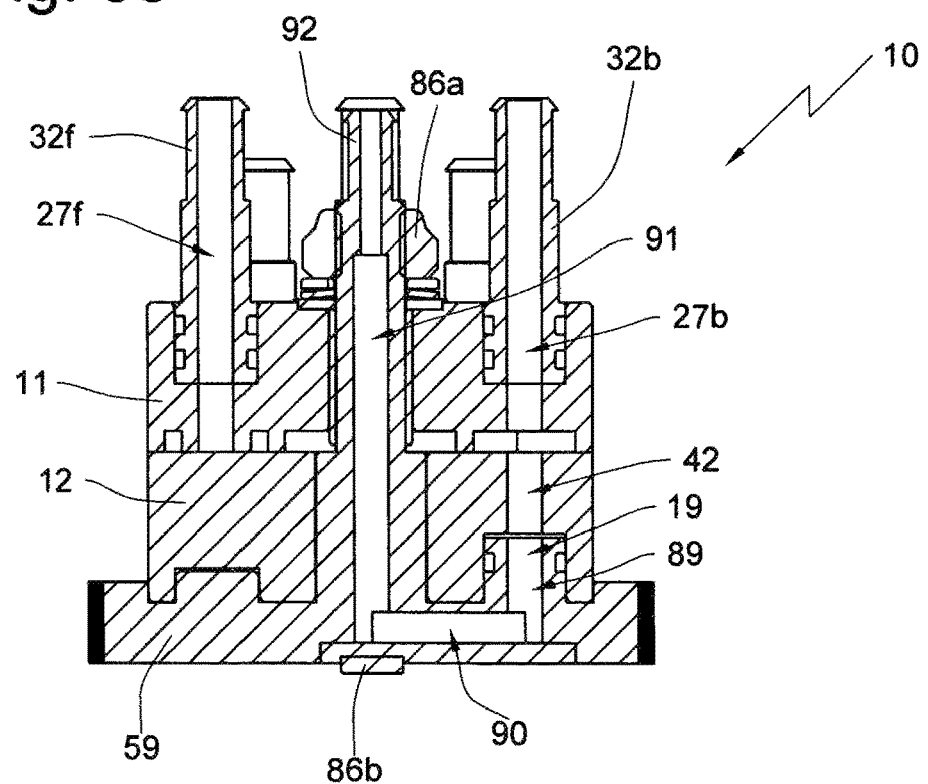
Figure 36:
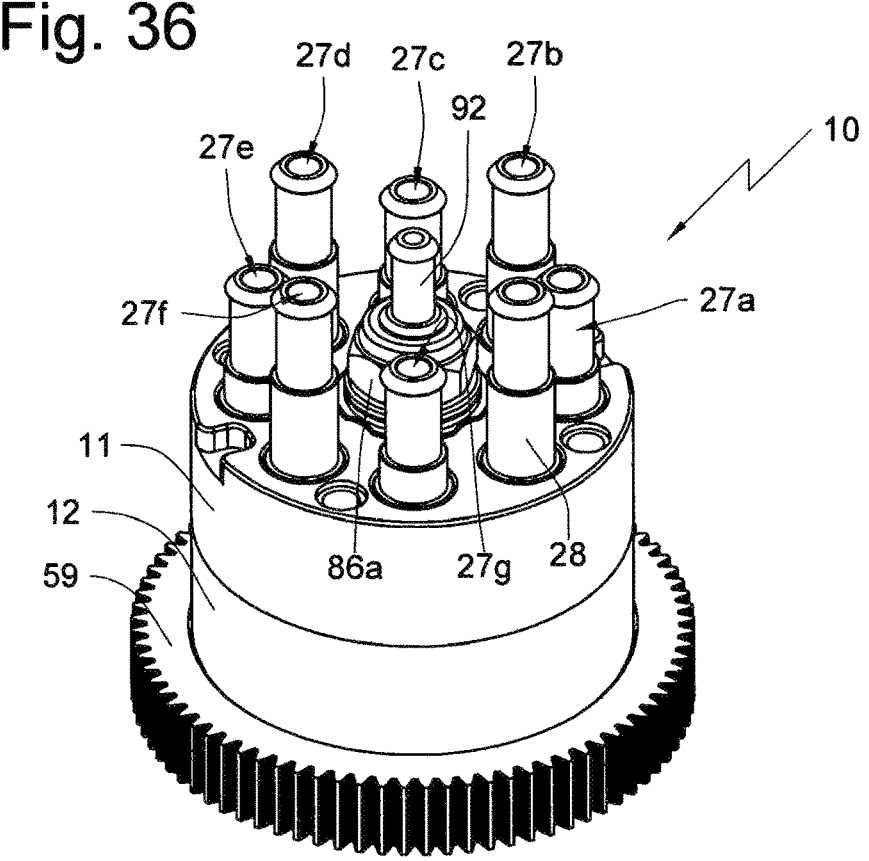

Further advantages of the invention emerge from the uncited sub-claims, as well as from the following description of the examples of embodiment of the invention represented in the drawings. In the drawings:

FIG. 1 shows, in a diagrammatic, partial cross-sectional view, a first example of embodiment of a valve body of an apparatus according to the invention, FIG. 2 shows a rear view, i.e. a view of the outlet port side, of the valve body of FIG. 1 according to viewing arrow II in FIG. 1, FIG. 3 shows a front view of the valve body of FIG. 1 according to viewing arrow III in FIG. 1, FIG. 4 shows a perspective view of the valve body roughly according to viewing arrow IV in FIG. 1, FIG. 5 shows a side view of the inlet port disk of an example of embodiment of the apparatus according to the invention, FIG. 6 shows a front view of the inlet port disk, i.e. a view of the inlet port side of the inlet port disk according to viewing arrow VI in FIG. 5, FIG. 7 shows a partial cross-sectional view through the inlet port disk roughly along cross-sectional line VII-VII in FIG. 6, FIG. 8 shows a view of the outlet port side of the inlet port disk according to viewing arrow VIII in FIG. 7, FIG. 9 shows a partial cross-sectional view through the inlet port disk of FIG. 8 according to cross-sectional line IX-IX in FIG. 8, FIG. 10 shows a perspective view through the inlet port disk according to viewing arrow X in FIG. 7, FIG. 11 shows, in a diagrammatic representation, an example of embodiment of an apparatus according to the invention in the assembled state with the inlet port disk, valve body and housing, FIG. 12 shows a diagrammatic view of the assembled apparatus roughly along viewing arrow XII in FIG. 11, FIG. 13 shows an assembled apparatus in a diagrammatic representation roughly according to cross-sectional line XIII-XIII in FIG. 12, FIG. 14 shows a perspective view of the apparatus roughly according to viewing arrow XIV in FIG. 11, FIG. 15 shows a perspective rear view roughly according to viewing arrow XV in FIG. 11, FIG. 16 shows a further example of embodiment of an apparatus according to the invention in a diagrammatic representation in the manner of a block diagram, with a user constituted as a washing machine and a plurality of indicated material supply containers and a flushing medium container, FIG. 17 shows, in a diagrammatic representation, an example of embodiment of a pipe disconnecting device disposed upstream of the apparatus according to the invention, as well as the flushing medium container of FIG. 16, FIG. 18 shows a further example of embodiment of an apparatus according to the invention in a representation similar to FIG. 13, wherein the drive and a driving toothed wheel and further details of the elements explained in the description of the FIGS. are also represented, FIG. 19 shows a further example of embodiment of an apparatus according to the invention in a representation according to FIG. 18, wherein a modified position marking element and a modified device for the position detection of the valve body is provided here, FIG. 20 shows a magnified detail representation of the position marking element used in this example of embodiment, roughly along viewing line XX in FIG. 19, FIG. 21 shows a further example of embodiment of an apparatus according to the invention, wherein the apparatus is used geometrically inverted, FIG. 22 shows a further example of embodiment of an apparatus according to the invention, wherein a row or series connection has been made in such a way that two apparatuses according to the invention are disposed with their outlet ports facing one another, in order to achieve a plurality of switchable communication paths, FIG. 23 shows a further example of embodiment of an inlet port disk of an alternative example of embodiment of an apparatus according to the invention in a perspective front view, similar to the representation of FIG. 6, FIG. 24 shows a perspective rear view of the inlet port disk of FIG. 23, FIG. 25 shows a further example of embodiment of a valve body of an alternative embodiment of an apparatus according to the invention in a front view, in a representation similar to FIG. 3, FIG. 26 shows a perspective rear view of the valve body of FIG. 25, FIG. 27 shows a further example of embodiment of an apparatus according to the invention in the assembled state using the inlet port disk of FIG. 23 and the valve body of FIG. 25 in a perspective view, FIG. 28 shows the assembled apparatus of FIG. 27 in a front view, according to viewing arrow XXVIII in FIG. 27, FIG. 29 shows a further example of embodiment of an inlet port disk of an apparatus according to the invention in a representation similar to FIG. 24, FIG. 30 shows a further example of embodiment of an apparatus according to the invention in a representation according to FIG. 28 using an inlet port disk of FIG. 29, FIG. 31 shows a further example of embodiment of a valve body for a further example of embodiment of an apparatus according to the invention in a representation according to FIG. 26 in a rear view, FIG. 32 shows the valve body of FIG. 31 in a front view in a representation similar to the representation of FIG. 25, FIG. 33 shows a further example of embodiment of an inlet port disk for an apparatus according to the invention in a front view, similar to a representation according to FIG. 24, FIG. 34 shows the inlet port disk of FIG. 33 in a rear view, FIG. 35 shows a further example of embodiment of an apparatus according to the invention in the assembled state in a diagrammatic cross-sectional view in a representation comparable to the representation of FIGS. 13, and FIG. 36 shows the apparatus of FIG. 35 in a perspective front view.

A plurality of examples of embodiment of the apparatus according to the invention are described below making reference to the drawings. For the sake of clarity, it is pointed out that parts or elements of the apparatus that are the same or comparable with one another are denoted, including where different examples of embodiment are concerned, by the same reference numbers, in some cases with the addition of small letters.

Each of the described examples of embodiment can be read—insofar as no technical contradictions arise—as an example of embodiment of each of the inventions described in the plurality of independent claims.

It should also be noted that technical features or elements or parts that are described in the following FIGS. only in respect of one or a number of examples of embodiment can, insofar as no technical contradictions exist, also be provided within the scope of the invention in the other examples of embodiment.

The apparatus according to the invention—including where different examples of embodiment are concerned—is denoted overall by 10. It is represented in a diagrammatic cross-sectional representation in FIG. 11 and comprises two essential central elements in the form of an inlet port disk 11 and a valve body 12.

The apparatus has a compact design and is, as indicated in FIG. 16, connected to a plurality of material supply containers 13a, 13b, 13c, 13d, 13e, 13f via lines 14a, 14b, 14c, 14d, 14e, 14f. A flushing medium container 15 and a line 16 connecting the latter is also worthy of mention.

Different materials or media 17a, 17b, 17c, 17d, 17e, 17f are accommodated in the different containers 13a, 13b, 13c, 13d, 13e, 13f. It involves fluids that can be transported through the lines with the aid of pumps.

The different materials 17a, 17b, 17c, 17d, 17e, 17f can for example be different detergent components, different concentrates, washing agent active ingredients, different enzymes, different surface-active agents, different mixtures of surface-active agents, different liquids etc. The above-described list of different materials relates to the case where user 18, i.e. the apparatus that is connected to an outlet port 19 of apparatus 10, is a washing machine indicated in FIG. 16, for example a household washing machine or an industrial washing machine.

In other areas of application, for example in the food industry, in which apparatus 10 is used for example to mix different food additives, other materials are of interest and are accommodated in containers 13a, 13b, 13c, 13d, 13e, 13f.

Apparatus 10 essentially serves to feed the different materials 17a, 17b, 17c, 17d, 17e, 17f in a metered manner at desired times to a common outlet port 19. Before a supply takes place to outlet port 19, the materials should be accommodated separate from one another, so that they cannot mix with one another or react with one another. One also speaks of phase separation. In particular, this is understandable when consideration is given to the fact that different chemicals that exhibit chemical aggressivity or reactivity may not be brought into contact with one another or may not be fed to washing machine 18 or another user until a specific predetermined time.

With reference to FIG. 16, it should be noted that the flow direction of the fluid stream through apparatus 10 is denoted overall by arrow P.

Provided downstream of outlet port 19 is a pump 20 that can be made available for example by a hose pump. Provided downstream or upstream of pump 20, but downstream of outlet port 19 according to FIG. 16, is an apparatus 21 for the through-flow measurement. Apparatus 21 can be connected via a signal line and/or control line 64a to a computer unit 22 (only indicated) that for example keeps a log of the through-flow quantities.

Pump 20 can also be connected to computer unit 22 via a signal line and/or control line 64c.

Apparatus 10 advantageously comprises a control 23 that is connected to apparatus 10, as merely indicated in FIG. 16, via a further signal and/or control line 64b.

Control 23 can for example activate a drive 62 of apparatus 10, the drive not being represented in FIG. 16 but indicated in FIG. 18. Furthermore, control 23 can be connected to user 18, for example to a control disposed in user 18 via a further signal and/or control line 64e. Control 23 can also be a component part of user 18.

Apparatus 10 can also be a component part of user 18, or can be disposed in or on it. Finally, control 23 can also be connected to computer unit 22 via a further signal and/or control line 64d. As the block diagram in FIG. 16 already makes clear, computer units 22 and control 23 can be made available by different modular units, but alternatively also by a common modular unit.

Provision can be made in examples of embodiment of the invention such that an apparatus 73 for measuring the conductivity is provided downstream of outlet port 19, as indicated in FIG. 16. The latter can be provided alternatively or in addition to apparatus 21 for the through-flow measurement, also represented, and can also be connected via an indicated signal and/or control line to computer unit 22.

The conductivity of the medium can be exactly determined with the aid of apparatus 73 for the conductivity measurement.

With an embodiment of the invention described subsequently in connection with FIG. 21, an device for the conductivity measurement (not represented there) can also be disposed downstream of inlet port 27x.

In the example of embodiment according to FIG. 16, the arrangement of apparatus 73 for the conductivity measurement is advantageous, for example, if solutions with different saline concentrations, or different saline solutions, are provided as different media. By the measurement of the conductivity, particular reliability can for example be guaranteed, or it can be established with a high degree of precision, and if need be logged, what saline solution has been used and at what time.

Apparatus 10 advantageously comprises, as indicated in FIG. 11, a housing 24. Valve body 12 and inlet port disk 11 are accommodated in the housing.

Inlet port disk 11 is described with the aid of FIGS. 5 to 10:

Inlet port disk 11 is essentially disc-shaped, i.e. it is an essentially circular element when viewed, outer diameter D whereof is greater than wall thickness W. Inlet port disk 11 comprises an inlet port side 25 and an outlet port side 26. Six inlet ports 27a, 27b, 27c, 27d, 27e, 27f are located on inlet port side 25. The number of inlet ports corresponds to the maximum number of material containers 13a, 13b, 13c, 13d, 13e, 13f that can be connected to apparatus 10. The number of six inlet ports represented in the described examples of embodiment is to be understood merely by way of example and is arbitrary.

Furthermore, an inlet port 28 for a flushing medium is provided on inlet port side 25 of inlet port disk 11. Disk 11 is provided in the center with a through-hole 29.

Through-hole 29, and likewise through through-hole 29 of valve body disk 12 to be described below, can be penetrated by a cantering element or a shaft or possibly a drive shaft, in particular can also be penetrated jointly. This will be explained further below with the aid of FIGS. 27 and 28.

As is made clear for example by the cross-sectional representation of FIG. 9, each inlet port 27a, 27b, 27c, 27d, 27e, 27f is constituted as a blind hole and comprises a narrower throughgoing passage region 30 and, compared with that, a somewhat wider neck region 31. A respective connecting piece 32 can be inserted into each neck region 31 (see FIG. 11), outer end 33 whereof can be connected for example to a hose. A particularly simple means of connection is thus provided.

Inlet port disk 11 comprises on its outlet port side 26 a number of inlet ports 34a, 34b, 34c, 34d, 34e, 34f corresponding to the number of inlet ports 27a, 27b, 27c, 27d, 27e, 27f.

Furthermore, an opening 35 (FIG. 8) is provided that communicates with flushing medium inlet port 28. Opening 35 emerges into a groove arrangement 36 (see FIG. 8 and FIG. 10) that comprises an essentially annular inner region 37 and groove-pocket ends 38a, 38b, 38c, 38d, 38e, 38f disposed star-shaped. The arrangement is made in such a way that a groove-pocket 38a is disposed as a flushing medium inlet port between two respective inlet ports 34a, 34b that communicate with inlet ports 27a, 27b.

Valve body 12 is described with the aid of FIGS. 1-4.

The valve body is an essentially disc-shaped body with an inlet port side 39 and an outlet port side 40. Disposed on outlet port side 40 of valve body 12 is outlet port 19 that, like inlet ports 27a, 27b, 27c, 27d, 27e, 27f, 28, comprises a widened neck region 31 and a narrower passage region 30, in particular in order to fit a hose with the aid of a connecting piece. Actual passage 42 is provided by narrow region 30 of outlet port 19.

Inlet port side 39 of valve body 12 is constituted completely smooth except for central through-hole 29 and mouth region 41 of passage 42.

In the assembled arrangement, inlet port disk 11 and valve body 12 are fitted in a concentric arrangement with respect to one another, in such a way that they are orientated along a common central axis M. Central axis M at the same time represents the geometrical rotational axis around which valve body 12 can be rotated relative to fixedly held inlet port disk 11.

With its outlet port side 26, inlet port disk 11 faces inlet port side 39 of valve body 12, wherein tightness with respect to the exterior is achieved between the two elements 11, 12 on account of the materials used and the exerted pressing forces. Depending on the rotational position of valve body 12, passage 42 can be brought with its mouth region 41 either into contact with a blocking region 43 of inlet port disk 11, or with an inlet port 34a, 34b, 34c, 34d, 34e, 34f or with a region 38 of groove 36.

If mouth region 41 of passage 42 lies opposite a blocking region 43, outlet port 19 is sealed off with respect to any of inlet ports 28, 27a, 27b, 27c, 27d, 27e, 27f etc., i.e. the apparatus blocks any fluid flow from supply containers 13a, 13b, 13c, 13d, 13e, 13f toward user 18 and closes containers 13a, 13b, 13c, 13d, 13e, 13f at the same time with respect to the exterior. Smooth region 65 (FIG. 3) of inlet port side 39 of valve body 12 at the same time ensures, through a corresponding cooperation with inlet ports 34a, 34b, 34c, 34d, 34e, 34f and with groove 36, complete sealing of all the inlet ports with respect to the exterior.

Only when passage 42 is moved, as a result of a rotation of valve body 12, into a position in which its mouth region 41 lies opposite an inlet port 34 and is in a communicative connection with associated inlet port 27 can a fluid flow be brought about through passage 42 by the generation of an subatmospheric pressure by pump 20 in passage 42.

When throughgoing passage 42 is to be displaced out of a first position, in which it lies for example opposite opening 34a, into another position in which it lies for example opposite opening 34b, it necessarily crosses groove-pocket 38a that represents a flushing medium inlet port. If passage 42 remains for a previously determined time in a position in which it lies opposite groove-pocket 38a, the pump can deliver a previously determined volume of flushing medium through passage 42 and in this way clean passage 42 free from residue.

A particular role is played here by the fact that passage 42 itself is constituted linear and has no unevennesses on its side walls. As a result, particularly advantageous flow conditions can be achieved that on the one hand permit a precise prior determination of the fluid flow through passage 42 required for cleaning, and on the other hand enable particularly advantageous complete flushing of passage 42.

FIG. 12 shows that valve body 12 is surrounded by a gear-tooth system 44. Gear-tooth system 44 can be a component part of a metallic or in particular a plastic annular body 59 that is fixed to valve body 12.

The cross-sectional representations of FIGS. 11, 18 and 13 show that annular body 59 can be placed on outlet port side 40 of valve body 12 and can partially engage over valve body 12 on the inside and outside. For this purpose, annular body 59 can be provided with a central extension 66 that engages in corresponding through-hole 29 of valve body 12. At the same time, material regions 67 of annular body 59 (FIG. 13) can be constituted such that valve body 12 is slightly overlapped on its outer lateral surface. The entire annular body 59 can be constituted by metal. It also comprises a through-hole 68 in an aligned arrangement with passage 42, as is shown in FIG. 11.

Alternative options are of course available to the person skilled in the art for providing a gear-tooth system 44 on valve body 12. For example, such a gear-tooth system can also be worked directly into the material of valve body 12.

Valve body 12, as also inlet port disk 11, is preferably made of a ceramic material. Surfaces 39, 26 lying opposite one another can advantageously be lapped.

The toothed wheel providing gear-tooth system 44 is connected non-rotatably to valve body 12.

FIG. 18 shows that, apart from inlet port disk 11, valve body 12 and toothed-wheel annular body 59, a drive 62, e.g. an electric motor, is also disposed inside housing 24. Drive 62 can cooperate via a spindle arrangement 61 with a driving toothed wheel 60. The teeth of this toothed wheel 60 mesh with gear-tooth system 44 of annular body 59 and, to this extent, can set valve body 12 into rotation and displace passage 42.

In order to activate drive 62, a control 63 is provided that is connected to the drive via a signal and/or control line 64*f*. Control 63 in the example of embodiment of FIG. 18 can be provided in addition to a control 23 according to the example of embodiment of FIG. 16. The two controls 23, 63 can however also be provided by a common component.

In FIGS. 11, 12 and 18, a position marking element 45 is indicated that is disposed only at a specific circumferential point of valve body 12 or is assigned to such a point. The rotational position of valve body 12 can be detected with the aid of position marking element 45, the position whereof is detected.

A position detection unit 69 is provided for this purpose that can be disposed for example in the region of housing 24 of apparatus 10. Position detection apparatus 69 can be made available by a sensor or a detector that can detect the presence of marking element 45, for example in its immediate vicinity. It can for example be a proximity sensor or—depending on the design and embodiment of marking element 45—an optical, electrical, inductive, capacitive, magnetic, acoustic or otherwise suitably constituted sensor.

Position detection unit 69 is connected via a signal and/or control line 64*g* to control 63 and in this way can communicate to control 63 the position in which valve body 12 or marking 45 is located.

Marking element 45 can be disposed on annular body 59, as is indicated in FIG. 18. Alternatively, marking element 45 can also be disposed directly on valve body 12.

In an alternative example of embodiment of the invention that is represented in FIGS. 19 and 20, element 45 for the position marking is constituted by a magnetic, in particular circular disc-shaped element. This is represented in FIG. 20 in a magnified detail view.

Two differently magnetized regions 45*a* and 45*b* can be seen, so that element 45 is constituted overall as a dipole magnet.

In the example of embodiment of FIG. 19, circular disk 45 is disposed concentric with central axis M of the apparatus.

Apparatus 69 for the position detection is also disposed in alignment with central axis M. The apparatus is connected to control 63 via a corresponding signal and/or control line 64*g*. In this example of embodiment, apparatus 69 for the position detection is constituted as a magnetic field sensor and is disposed fixedly on housing 24.

Control 63 preferably constantly detects the position of marking element 45.

The examples of embodiment represented in the drawings make provision such that valve body 12 can be displaced relative to fixedly held inlet port disk 11.

In examples of embodiment of the invention not represented, valve body 12 can also be fixedly held and inlet port disk 11 can be displaced relative to valve body 12.

The two cross-sectional representations of FIG. 11 and FIG. 13 show the same rotational position of valve body 12 relative to a disk 11. According to FIG. 11, passage 42 is in an aligned arrangement with respect to a groove-pocket 38 of flushing medium groove 36, i.e. in the flushing position. In this position of valve body 12, pump 20 can convey flushing medium through passage 42.

In the rotational position according to FIG. 13 (this is the same rotational position as in FIG. 12), it can clearly be seen that inlet port side 39 of valve body 12 closes in a sealing manner corresponding inlet ports 34*a*, 34*b*, 34*c*, 34*d*, 34*e*, 34*f* lying opposite.

FIG. 14 clearly shows that a connecting piece 33*a*, 33*b*, 33*c*, 33*d*, 33*e*, 33*f* can be inserted into respective inlet port 27*a*, 27*b*, 27*c*, 27*d*, 27*e*, 27*f*. Hoses, in particular, can thus be connected in a straightforward manner.

A pipe disconnecting device, a so-called pipe disconnector 46, is also described with the aid of the example of embodiment of FIG. 17. Related to the example of embodiment of FIG. 16, pipe disconnector 46 is assigned to a flushing device 47 and is disposed upstream of flushing medium inlet port 28.

Pipe disconnecting device 46 and flushing device 47 comprise a container 15 for flushing medium 48. Flushing medium 48 is water in the present case.

In order to prevent chemical impurities or germs from entering into water main 49, a valve 51 that can be automatically opened and closed is provided in the region of an outlet port 50 of the water main. A control 52 is connected via a control line 53 to valve 51.

A lower level sensor 54 and an upper level sensor 55 are assigned to flushing medium container 15. Both sensors 54, 55 are also connected via lines 56, 57 to control 52.

As soon as level sensor 54 ascertains that a certain level is fallen below, because the remaining flushing medium volume has diminished due to the removal of flushing medium 48 from container 15, a signal is relayed via control line 56 to control 52. A processor 58 assigned for example to control 52 then sends a signal to valve 51 via control line 53 to initiate a valve opening. Water can then pass out of water main 49 into container 15, wherein it covers a section WS in freefall. Container 15 is filled until such time as an upper level is reached that is detected by upper level sensor 55. When the reaching of the upper level is detected, control 52 can be informed via control line 57, the control then activating valve 51 via control line 53 in order to initiate a closing procedure. After completion of the closing procedure, water main 49 is again hermetically sealed.

The advantage of such a pipe disconnecting device 46 lies in the fact that water main 49 is protected against backflows, against contamination due to germs or chemicals. The water can pass through a predefined drop section in freefall. Backflows are therefore eliminated.

In particular, this advantageously enables, with a straightforward design, a connection of inventive apparatus 10 to water main 49 with the aid of a pipe disconnecting device 46.

The geometrical configuration of containers 13 for media 17 and of container 15 for flushing medium 48 and the corresponding connection of lines 14 and 16 are only indicated and described diagrammatically. The corresponding connecting lines are preferably connected to containers 13 via so-called suction lances, in order to remove corresponding media 17, i.e. the flushing medium, and to enable residual emptying.

The examples of embodiment of the apparatus according to the invention have been described on the basis of an arrangement that comprises two elements displaceable relative to one another, i.e. an inlet port disk 11 held fixedly relative to the housing and a valve body 12 displaceable relative thereto. In other examples of embodiment, which are not represented in the figures, three or more elements, in particular disc-shaped elements, could be provided in a stack arrangement.

Instead of a rotational displacement of a valve body, a linear displacement of valve body 12 also comes into consideration.

The example of embodiment has been described on the basis of two disks that are made of a ceramic material. Other materials, for example plastic, metal, or materials provided with special surfaces or treated in a special way can also be included.

The embodiments of the invention represented in the drawings each represent a single apparatus, with which a plurality of inlet ports can be brought into a communicative connection with the outlet port, optionally in a switchable manner. The invention also includes a plurality of such apparatuses 10 being connected to one another in series or in parallel, in order—depending on the intended purpose and requirement—to increase the number of fluids to be mixed or to be fed.

Insofar as the apparatus according to the invention employs a through-flow measuring apparatus, which is preferably provided downstream of the outlet port, it is particularly advantageous if only a single through-flow measuring apparatus is provided.

The described apparatus is preferably used in combination with a user constituted as washing machine 18. The user can however also be a medical apparatus, in which different chemicals are combined for the mixing of a medicine, or it can be used in another way for the treatment of illnesses. However, users can alternatively also be suitably constituted in other areas of cleaning technology, process technology, medicine, agriculture, chemistry, food technology, and can for example comprise a suitable collection container or mixing container.

The apparatus according to the invention can also be used for the analysis of blood or urine samples. For example, the user can comprise a vessel that is a component part of an analysis apparatus. For example, reactions of the substance to be analyzed with the introduced different media, e.g. different saline solutions or saline solutions with different concentrations, can take place in the vessel.

The use of an apparatus according to the preamble of claim 1 is for example also particularly advantageous for this if, for example, different material containers 13 are charged with different saline solutions, and the user comprises the sample vessel.

The method according to the invention makes it possible, after a step of introducing a fluid into the passage, to flush the passage with a flushing medium as a result of a displacement of the latter. Each time after a first material has been carried out of the first inlet port into the passage, a flushing medium 48 is preferably introduced into passage 42 after displacement of valve body 12.

Water can be used as a flushing medium that in particular enables an advantageous connection with water main 24.

In other examples of embodiment, however, provision can also be made to use media other than water as a flushing medium.

In an embodiment of the invention, non-return valves are provided upstream of inlet ports 27. The non-return valves prevent flushing medium 48 or fluids 17 other than those intended from passing undesirably into corresponding containers 13 or into corresponding supply lines 14, 16.

A housing arrangement 24 is advantageously provided, which engages tank-shaped around the two ceramic parts, in particular inlet port disk 11 and valve body 12. The geometrical arrangement is preferably made in such a way that rotational axis M is orientated vertically and valve body 12 is disposed above inlet port disk 11.

Inlet port disk 11 and valve body 12 are also advantageously acted upon relative to one another in the axial direction by a spring force. Ball compression spring elements can be provided for this purpose. In this connection, FIG. 18 indicates that sleeves 70 can be disposed at the upper wall of housing 24, in which sleeves balls 71 are guided, the balls being acted upon by springs 72 in the extending sense. Springs 72 are also disposed inside respective sleeve 70.

As a result of the spring force, balls 71 exert a force on annular body 59 and thus at the same time on valve body 12, the force serving to load inlet port side 39 of valve body 12 toward outlet port side 26 of inlet port disk 11. The desired tightness between the two surfaces 26, 39 lying against one another can thus be guaranteed.

The position of passage 42 or valve body 12 can be detected constantly by unit 69 or control 63, or can be so only at specific times, for example before and after each activation by drive 62.

Valve body 12 can comprise an over-rotation lock (not represented). This means that valve body 12 can always be rotated only over a maximum angular range of for example 355° and then a safety lock prevents a rotation from taking place beyond the predetermined maximum angle. It is thus possible to ensure, for example, that lines or hoses do not twist beyond a predetermined extent.

In order to bring passage 42 into a communicative communication with a specific inlet port, it may be necessary for a complete reverse rotation of valve body 12 to take place.

The apparatus can for example also be constituted as a retrofitting apparatus in order to be connected to existing washing machines. It can advantageously be connected via an interface, for example via a control, e.g. via a relay, to a program selection switch of an industrial washing machine. For this purpose, provision can for example also be made for an adaptation and conversion of the control signals received from a relay of a conventional industrial washing machine or washing machine into new control signals.

The example of embodiment of FIG. 21 shows an apparatus according to the preamble of claim 1, wherein the plurality of inlet ports have been converted into a plurality of outlet ports and the single outlet port has been converted into the single inlet port. A geometrically inverted arrangement is thus made here, wherein the outlet port is disposed upstream of the inlet ports, related to flow direction P.

With the inventive apparatus according to the preamble of claim 1 used in this way, single inlet port 27x is connected to a flushing medium container 15 or a material container.

The numerous outlet ports 19x1, 19x2, 19x3, 19x4, 19x5 are connected via corresponding lines 14a, 14b, 14c, 14d, 14e, 14f to a plurality of users 18a, 18b, 18c, 18d, 18e, 18f.

The activation of the valve body not represented in the example of embodiment of FIG. 21 can take place in a similar way to that explained with respect to the example of embodiment of FIG. 16. This takes place solely with the difference that, instead of a plurality of material containers 13 and flushing medium container 15, only a single output container 15 (material container or flushing medium container) is now used and, instead of a single user 18 in the example of embodiment of FIG. 16, a plurality of users 18a, 18b, 18c, 18d, 18e, 18f is now used in the example of embodiment of FIG. 21.

FIG. 21 thus shows an example of embodiment of an apparatus according to claim 11.

Finally, it is noted with regard to the example of embodiment of FIG. 22 that here two apparatuses 10a and 10b are disposed in series facing one another geometrically inverted.

Along dashed parting plane T, the example of embodiment of FIG. 16 in the upper part of FIG. 22 and the example of embodiment of FIG. 21 in the lower part of FIG. 22 have as it were been combined, in such a way that the user of apparatus 10a is now provided by apparatus 10b, or in other words, output material container 15 of apparatus 10b is now provided by apparatus 10a.

It is clear to the person skilled in the art that such a series inverted arrangement of two apparatuses according to the invention leads to a marked increase in the number of possible switchable, communicative connection paths. In specific cases of application, a greater number of variants of switching paths can thus be achieved.

With regard to the relative spatial arrangement of apparatus 10 in relation to material containers 13, and to flushing medium container 15, provision can be made according to a first variant such that apparatus 10, related to the orientation prescribed by gravitational force, is located above material supply containers 13, and the flushing medium container. The effect of this, even if slight tightness problems are present in the apparatus, is that the media in principle run back into the material containers. With an alternative embodiment of the invention, material supply containers 13, related to the direction prescribed by gravitational force, can be disposed above the apparatus in order, for example, to prevent media from running back into the material supply containers when there are tightness problems in the apparatus.

A further alternative example of embodiment of an inlet port disk 11 for use in an apparatus according to the invention is described with the aid of FIGS. 23 and 24.

As in the case of inlet port disk 11 according to FIGS. 5 to 10, the inlet port side of inlet port disk 11 is denoted by 25 and its outlet port side by 26. Located on inlet port side 25 is an inlet port 28 for a flushing medium, as well as seven further inlet ports 27a, 27b, 27c, 27d, 27e, 27f, 27g for materials or media. Inlet port disk 11 is penetrated by a central through-hole 29.

On its outlet port side 26, inlet port disk 11 comprises a number of inlet ports 34a, 34b, 34c, 34d, 34e, 34f, 34g corresponding to the number of inlet ports 27a, 27b, 27c, 27d, 27e, 27f, 27g. Furthermore, an opening 35 is provided (FIG. 24) that communicates with flushing medium inlet port 28. Opening 35 emerges into a groove arrangement 36. Groove arrangement 36 comprises groove-pocket regions 38a, 38b, 38c, 38d, 38e, 38f, 38g, which each extend between two inlet ports (e.g. 34a, 34b). Groove 36 is therefore also constituted in this example of embodiment in such a way that a pocket region 38a of flushing medium groove 36 is located between two respective inlet ports (e.g. 34a, 34b).

Overall, groove 36 for the flushing medium is constituted according to FIG. 24 such that it completely surrounds a respective material inlet port (e.g. 34a). This leads to a particularly optimized flushing capability of the decisive surfaces coming into contact with one another, and to a particularly reliable separation of different media from one another.

In the example of embodiment according to FIG. 24, flushing medium groove 36 is bordered by a bottom surface 74, and by an inner lateral surface 75 and by an outer lateral surface 76. Inner lateral surface 75 is a component part of an outer annular collar 77 and outer lateral surface 76 is a component part of an inner annular collar 78.

Furthermore, flushing medium groove 36 is bordered by outer lateral surfaces 79a, 79b, 79c, 79d, 79e, 79f, 79g etc. that are disposed respectively on an annular collar 80a, 80b, 80c, 80d, 80e, 80f, 80g, wherein each annular collar 80a, 80b, 80c, 80d, 80e, 80f, 80g surrounds a material inlet port 34a, 34b, 34c, 34d, 34e, 34f, 34g.

In the assembled state, inlet port side 39 of valve body 12 of FIGS. 25 and 26 functions as a sealing surface with respect to flushing medium groove 36 and with respect to material inlet ports 34a, 34b, 34c, 34d, 34e, 34f, 34g.

In the assembled state of apparatus 10, this sealing surface 39 makes contact with an annular end face 81 of inner annular collar 78, an annular end face 82 of outer annular collar 77, and individual annular end faces 83a, 83b, 83c, 83d, 83e, 83f, 83g of individual annular collars 80a, 80b, 80c, 80d, 80e, 80f, 80g that extend around inlet port 34a, 34b, 34c, 34d, 34e, 34f, 34g.

As a result of this geometrical embodiment of a flushing medium groove 36 constituted over a large area, it is possible to keep the total area of the decisive, effective sealing surfaces small. Optimum forces for the rotational displacement of the valve body as well as optimized sealing can thus be achieved.

With regard to the example of embodiment of valve body 12 represented in FIGS. 25 and 26, which can be used in cooperation with an inlet port disk 11 according to FIGS. 23 and 24, it should be noted that the latter essentially corresponds to the valve body of FIGS. 1 to 4. Only three additional blind holes 84a, 84b, 84c are represented here on outlet port side 40 of the valve body, the blind holes being able to ensure better positioning and cantering of built-on parts or, in particular, rotary contact closure of valve body 12 with toothed wheel 59 represented in the example of embodiment of FIG. 27.

According to FIGS. 27 and 28, a further distinctive feature is to be explained in a further example of embodiment of apparatus 10 according to the invention.

As described above, both valve body 12 according to FIG. 25 and inlet port disk 23 comprise a central through-hole 29.

In assembled apparatus 10 according to FIGS. 27 and 28, a central connecting piece or bolt 85 engages through this through-hole 29. Connecting piece 85 enables central, axial clamping of the two elements 11 and 12 directly against one another, wherein the previously discussed decisive sealing surfaces, i.e. inner side 39 of valve body 12 and annular end faces 81, 82, 83a, 83b, 83c, 83d, 83e, 83f, 83g are clamped directly on one another. Connecting piece 85 can for example be constituted as a screw and can be provided with a hexagonal screw head 86a and with an external thread at its opposite end, on which a screw nut 86b sits.

Screw head 86a can for example be sunk into a corresponding form-fit opening of toothed wheel 29, which both guarantees a rotary contact closure with toothed wheel 59, and also provides axial lock with respect thereto. The corresponding opening in toothed wheel 59 can be constituted for example as a blind hole that enables insertion of screw head 86a only to an extend such that the outer side of screw head 86a is disposed flush with the toothed wheel surface, as can be seen in FIG. 27.

The other end of connecting piece 85 can be provided with a screw 86b according to FIG. 28, so that axial clamping of inlet port disk 11 with valve body 12 is enabled by rotation of screw 86b with fixedly held toothed wheel 59 and fixedly held inlet port disk 11 or with fixedly held apparatus 10 overall. The axial force and therefore the contact force can be adjusted very precisely by using a torque spanner.

The direct axial clamping of the two elements 11, 12 against one another, the elements comprising respective sealing surfaces 39 and respectively 81, 82, 83, enables an optimized distribution and evening-out of the contact forces. Risks of asymmetries of the contact force with respect to the rotational axis of valve body 12 are thus minimized.

Moreover, interfering influences of additional parts, such as for example housing parts, on the exactly predetermined contact force can be avoided.

According to the example of embodiment of FIGS. 29 and 30, in a further variant of an apparatus 10 according to the invention, inlet port disk 11 is constituted in such a way that inlet ports 27a, 27b, 27c, 27d, 27e, 27f, 27g and flushing medium inlet port 28 lie on different radii. According to FIG. 30, inlet ports 27a, 27c, 27e and 27g are disposed of a first larger radius around the central axis, and inlet ports 27b, 27d, 27f and flushing medium inlet port 28 are disposed on a second, smaller radius. A modified routing of the supply lines to the corresponding connecting pieces can thus be achieved, which for example enables an arrangement that requires only a small installation space.

Outlet port side 26 of inlet port disk 11 is represented in FIG. 29. Material inlet ports 34b, 34d and 34f, assigned inlet ports 27b, 27d, 27f whereof lie on the smaller, inner radius, are constituted here elongated in the radial direction, in order to enable a communicative connection with passage 42—provided there is a corresponding rotational position of valve body 12. Assigned annular collars 80b, 80d and 80f that surround inlet ports 34b, 34d, 34f, are accordingly also constituted elongated.

A further possible valve body 12 is described below with the aid of the example of embodiment of FIGS. 31 and 32 and a further example of embodiment of an inlet port disk 11 is described below with the aid of FIGS. 33 and 34. Valve body 12 and inlet port disk 11 according to FIGS. 31 to 34 can also be used, instead of previously described inlet port disk 11 and valve body 12, in the other examples of embodiment of the invention.

Inlet port disk 11 according to FIGS. 33 and 34 and valve body 12 according to FIGS. 31 and 32 have in common the fact that both disks 11, 12 are provided with a greatly reduced flange wall thickness WST that leads to a considerable saving on material. As a component part of disk 12, four connecting pieces 87a, 87b, 87c, 87d extend from outlet port side 40 of valve body 12. The latter are integrally formed, in a firmly bonded manner and of a uniform material, at rear side 40 of valve body 12. Connecting piece 87d provides outlet port 19, and comprises—comparable to the arrangement of valve body 12 according to FIG. 26—an inlet port for the connection of a hose line, in particular for the insertion of a hose connecting piece of a hose line.

Connecting pieces 87a, 87b and 87c provide blind holes 84a, 84b, 84c that—as in the case of the example of embodiment of FIG. 26—can serve for the positioning or cantering of toothed wheel 59.

In the case of the example of embodiment of inlet port disk 11 according to FIGS. 33 and 34, corresponding connecting pieces 88a, 88b, 88c, 88d, 88e, 88f, 88g, 88h extend away from inlet port side 25 of inlet port disk 11. The corresponding connecting pieces provide inlet ports 27a, 27b, 27c, 27d, 27e, 27f, 27g. Connecting piece 88h provides flushing medium inlet port 28.

Total wall thickness W of inlet port disk 11 (FIG. 33) can correspond to wall thickness W of an inlet port disk according to the previous examples of embodiment, for example according to FIG. 5. Disk 11 according to FIG. 33 thus has a wall thickness W that is made up of the sum of flange wall thickness WST of the circular region and height HE of a connecting piece 88.

As a result of the fact that individual inlet ports 27a, 27b, 27c, 27d, 27e, 27f, 27g, flushing medium inlet port 28 and outlet port 19 are provided by a respective connecting piece, a considerable saving on material is on the one hand enabled. On the other hand, several design-related and production-related advantages thus arise, in particular the possibility of being able to make use of different production processes for the two disks 11 and 12.

According to an advantageous embodiment of the invention, individual connecting pieces 87d and 88a, 88b, 88c, 88d, 88e, 88f, 88g, 88h can also be constituted such that they enable a hose line to engage directly. For this purpose, the free rims of connecting pieces 88a, 88b, 88c, 88d, 88e, 88f, 88g, 88h and also 87d can for example be provided with conical run-on bevels.

Individual connecting pieces 88 can thus be constituted in this way at their free end region, as for example the hose connecting piece denoted by 32f in FIG. 35 is constituted at its free end.

Alternatively, provision can also be made, as is represented in FIGS. 31 to 34, such that separate hose connecting pieces affixed to the hose lines, as represented for example in FIG. 11 and denoted there by 32, are inserted and/or pressed into respective opening 27a, 27b, 27c, 27d, 27e, 27f, 27g and 28 of connecting piece 88a, 88b, 88c, 88d, 88e, 88f, 88g, 88h.

A further example of embodiment of an apparatus 10 according to the invention is described below with the aid of FIGS. 35 and 36. Here, once again, a concentric stack arrangement of an inlet port disk 11, a valve body 12 and a toothed wheel 59 is made. Passage 42 disposed in valve body 12 emerges into an outlet port 19 of valve body 12. An inlet port 89 of a radial passage 90 is disposed lying opposite this outlet port 19, the radial passage being located inside toothed wheel 59. The toothed wheel element, which can also be designated a cover element, provides for a return of the medium through a central return passage 91, the medium running axially inside a hollow mandrel. This return passage emerges in the region of inlet port disk 11, at its inlet port side 25, into an outlet port connecting piece 92. The hollow mandrel is constituted in one piece with toothed wheel 59.

In this embodiment of the invention, all the connections can be provided at inlet port side 25 of inlet port disk 11.

The toothed wheel denoted by 59, which can also be designated as a cover element or return element, thus also serves to connect outlet port 19 disposed on valve body 12, with the aid of passages 90, 91, to a mouth opening 92 at the inlet port side 25 of inlet port disk 11, in order there to enable a simplified connection of the hose lines and in order to accommodate apparatus 10 in the case of restricted installation space.

FIG. 35 shows an example of embodiment, wherein passage 42 is constituted linear. The passage disposed in toothed wheel element 59 and constituted by radial passage 90 and return passage 91, however, comprises corners. A passage structure comprising corners and therefore dead space regions is however only suitable for applications in which the media to be conveyed do not collect in corner regions on account of their properties, or in which mixing of the media is not a disadvantage. Various essential oils that are fed as media to the steam flow of a sauna are an example of such a case of application.

The example of embodiment of FIG. 35 shows a toothed wheel 59. In other examples of embodiment, which are not represented, element 59 is also constituted as a drive element for the valve body, i.e. as a rotary entrainment element for the valve body, and can be driven in a manner other than with the aid of an outer toothed wheel rim.

In further examples of embodiment not represented, this drive element 59 is provided with a central mandrel, similar to that represented in FIG. 35 that is disposed in one piece with the drive element, but without a return passage 91 being disposed therein. In these cases, the mandrel serves to engage through central holes 29 in valve body 12 and inlet port disk 19, and to enable axial clamping of the two disks 11, 12 against one another, and against a stop face on the drive element. As shown by the example of embodiment of FIG. 35, the free end of the mandrel can thus be provided with an external thread, on which a screw nut 86a is disposed, which clamps inlet port disk 11 axially against valve body 12.

The invention claimed is:

1. A system comprising:

an apparatus having a face and formed with a plurality of material inlet ports, a flushing inlet port, and an outlet port, the material inlet ports and flushing inlet port opening on the face;

respective supplies of at least two different liquid materials, the supplies each being connected to a respective one of the material inlet ports;

a supply of flushing medium connected to the flushing inlet port;

a rotor having an entry face directly engaging the face of the apparatus without interposition of a seal, formed with a passage, and shiftable between a plurality of positions in each of which a respective one of the inlet ports is connected to the outlet port; and control means for moving the rotor between the positions such that, after each time the rotor is in a position connecting one of the material inlet ports to the outlet port and material has passed through the passage, the rotor is moved into a position connecting the passage with the flushing inlet port for flushing out the passage.

2. The system according to claim 1, further comprising a target device, the outlet port being connected to the target device, the target device being a washing machine or a dish washer.

3. The system according to claim 1, wherein the rotor is formed of ceramic material.

4. The system according to claim 1, further comprising:

a flushing device for flushing the throughgoing passage of the flushing device and connected to the water mains network with the interposition of a pipe-disconnecting device.

\* \* \* \* \*